US012761843B2

(12) United States Patent
Baba

(10) Patent No.: US 12,761,843 B2
(45) Date of Patent: Oct. 13, 2026

(54) RELAY DEVICE HAVING PROXY SERVER FUNCTION, CONTROL METHOD THEREOF, AND RECORDING MEDIUM

(71) Applicant: CANON KABUSHIKI KAISHA, Tokyo (JP)

(72) Inventor: Shohei Baba, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 239 days.

(21) Appl. No.: 18/894,423

(22) Filed: Sep. 24, 2024

(65) Prior Publication Data

US 2025/0117168 A1 Apr. 10, 2025

(30) Foreign Application Priority Data

Oct. 4, 2023 (JP) ................................ 2023-173236
May 22, 2024 (JP) ................................ 2024-083628

(51) Int. Cl.
*G06F 3/12* (2006.01)
*H04L 41/0816* (2022.01)
*H04L 43/0817* (2022.01)
*H04L 67/561* (2022.01)

(52) U.S. Cl.
CPC .......... *G06F 3/123* (2013.01); *H04L 41/0816* (2013.01); *H04L 43/0817* (2013.01); *H04L 67/561* (2022.05)

(58) Field of Classification Search
CPC . G06F 3/123; H04L 41/0816; H04L 43/0817; H04L 67/561
USPC ........................................................ 358/1.13
See application file for complete search history.

(56) References Cited

U.S. PATENT DOCUMENTS

2009/0300215 A1* 12/2009 Gnanasambandam ..................... H04L 69/26 709/242
2017/0099178 A1* 4/2017 Satoh .................. H04L 41/0661
2018/0255153 A1* 9/2018 Koizumi ............. H04L 63/0281

FOREIGN PATENT DOCUMENTS

JP 2017126191 A 7/2017

* cited by examiner

*Primary Examiner* — Charlotte M Baker
(74) *Attorney, Agent, or Firm* — ROSSI, KIMMS & McDOWELL LLP

(57) ABSTRACT

A monitoring device that is a relay device including a proxy server function of relaying communication between a device management service and a device determines whether or not a device receiving a device management service without using a proxy server function of the relay device has a self-monitoring function for the device management service, performs proxy setting on the device using proxy information of a proxy server function of the relay device in a case where the device has a self-monitoring function, and provides a registration instruction to a device to which the proxy setting has been performed to be re-registered as a device having a self-monitoring function in the device management service.

9 Claims, 21 Drawing Sheets

FIG. 8

| 801 Device ID | 802 Serial No. | 803 IP address | ・・・ | 804 Management state | 805 Registration state | 806 Monitoring type | 807 Re-registration flag | 808 Device management service device ID |
|---|---|---|---|---|---|---|---|---|
| 00000001 | AAA111 | 172.16.11.11 | ・・・ | Management target | Registered | Proxy | 0 | Dev01 |
| 00000002 | AAA222 | 172.16.11.22 | ・・・ | Management target | Registered | Polling | 1 | Dev02 |
| 00000003 | AAA333 | 172.16.11.33 | ・・・ | Management target | Unregistered | Proxy | 0 | Dev03 |
| 00000004 | AAA444 | 172.16.11.44 | ・・・ | Management target | Unregistered | Polling | 0 | Dev04 |
| 00000005 | AAA555 | 172.16.11.55 | ・・・ | Non-management target | Unregistered | Unknown | 0 | Dev05 |
| : | : | : | : | : | : | : | : | : |

FIG. 9A

| Device ID (901) | Serial No. (902) | Tenant ID (903) | ··· | Agent ID (904) | Status (905) |
|---|---|---|---|---|---|
| Dev01 | AAA111 | Tenant01 | ··· | Agent01 | Valid |
| Dev02 | AAA222 | Tenant02 | ··· | Agent02 | Invalid |
| | | | | | |

FIG. 9B

| Agent ID (906) | Tenant ID (907) | ··· | Client ID (908) | Status (909) |
|---|---|---|---|---|
| Agent01 | Tenant01 | ··· | Client01 | Valid |
| Agent02 | Tenant02 | ··· | Client02 | Invalid |
| | | | | |

FIG. 10

| Client ID (1001) | Serial No. (1002) | Tenant ID (1003) | ・・・ | Status (1004) |
|---|---|---|---|---|
| Dev01 | AAA111 | Tenant01 | ・・・ | Valid |
| Dev02 | AAA222 | Tenant02 | ・・・ | Invalid |
| | | | | |

FIG. 11

1101 1102 1103

| Device registration key | Tenant ID | Expiration date | ··· |
|---|---|---|---|
| 48hoa89f8k | Tenant01 | 2022/04/15 15:42:24 | ··· |
| | | | ··· |
| | | | |

FIG. 12

| Activation code (1201) | Serial No. (1202) | Device registration key (1203) | Expiration date (1204) | ··· |
|---|---|---|---|---|
| 8h987h7h9 | Dev01 | 48hoa89f8k | 2022/04/15 16:32:14 | ··· |
| | | | ··· | ··· |
| | | | | |

FIG. 13

1301 1302

| Client ID | Credential | ··· |
|---|---|---|
| Dev01 | il8fs36gfw | ··· |
| | | ··· |
| | | |

FIG. 20

| | Key | Value |
|---|---|---|
| 2000 | Mode | Proxy |

RELAY DEVICE HAVING PROXY SERVER FUNCTION, CONTROL METHOD THEREOF, AND RECORDING MEDIUM

BACKGROUND OF THE INVENTION

Field of the Invention

The present invention relates to a relay device having a proxy server function, a control method thereof, and a recording medium.

Description of the Related Art

In recent years, various devices are connected to a server and a cloud service via a network. There is a mechanism referred to as Internet of Things (IoT) that provides a high-value-added service to a device connected to a cloud service and the like via a network. The IoT roughly includes two systems. The first is a device management system including a device management service for managing connected devices, a storage service for managing collected device information, and an authentication/authorization service having an authentication/authorization function for securely connecting devices to a cloud service. The second is a contract service providing system that provides various services such as a device maintenance service and a reporting service in cooperation with the device management system. Japanese Patent Application Laid-Open No. 2017-126191 discloses a system in which a certain device is replaced with another device in the same network and this device is registered as a client in an authentication/authorization server.

As disclosed in Japanese Patent Application Laid-Open No. 2017-126191, there are some cases where a certain device controls registration processing in place of another device. For example, there is a case where a monitoring apparatus that performs aggregation management of a plurality of devices having a self-monitoring function via its local proxy function issues a registration instruction to the devices having the self-monitoring function under the monitoring apparatus. In some cases, the monitoring apparatus registers a plurality of devices having no self-monitoring function in place of the devices.

However, since the cloud service can provide different functions to the device having the self-monitoring function and the device not having the self-monitoring function, the management and registration methods of the respective devices may be different on the cloud service side. Typically, functions that can be remotely monitored from the monitoring apparatus are limited. Therefore, since the device having the self-monitoring function can receive more services, it is preferable that the device preferentially uses the self-monitoring function. In a case where a device that does not have a self-monitoring function becomes a device that has a self-monitoring function due to the update of firmware, if the self-monitoring function is enabled, it is necessary to perform switching of registration (re-registration) of the device on the cloud service side.

SUMMARY OF THE INVENTION

The present invention provides a relay device that switches device registration to a device management service according to the self-monitoring function of a device.

A relay device of the present invention is a relay device including a proxy server function of relaying communication between a device management service and a device, the relay device comprising: a memory storing instructions; and a processor executing the instructions causing the relay device to: determine whether or not a device receiving a device management service without using a proxy server function of the relay device has a self-monitoring function for the device management service; perform proxy setting on the device using proxy information of a proxy server function of the relay device in a case where the device has a self-monitoring function; and provide a registration instruction to a device that has performed the proxy setting to be re-registered as a device having a self-monitoring function in the device management service.

Further features of the present invention will become apparent from the following description of exemplary embodiments with reference to the attached drawings.

BRIEF DESCRIPTION OF THE DRAWINGS

FIG. 8 is a diagram illustrating an example of a device management information table managed by the monitoring apparatus.

FIGS. 9A and 9B are diagrams illustrating examples of a device management table and an agent management table managed by a device management server.

FIG. 10 is a diagram illustrating an example of a client management table managed by an authentication/authorization server.

FIG. 11 is a diagram illustrating an example of a device registration key management table managed by the authentication/authorization server.

FIG. 12 is a diagram illustrating an example of an activation code management table managed by the authentication/authorization server.

FIG. 13 is a diagram illustrating an example of a credential management table managed by the authentication/authorization server.

FIG. 20 is a diagram illustrating an example of a monitoring mode management table.

DESCRIPTION OF THE EMBODIMENTS

First Embodiment

Figure 1:
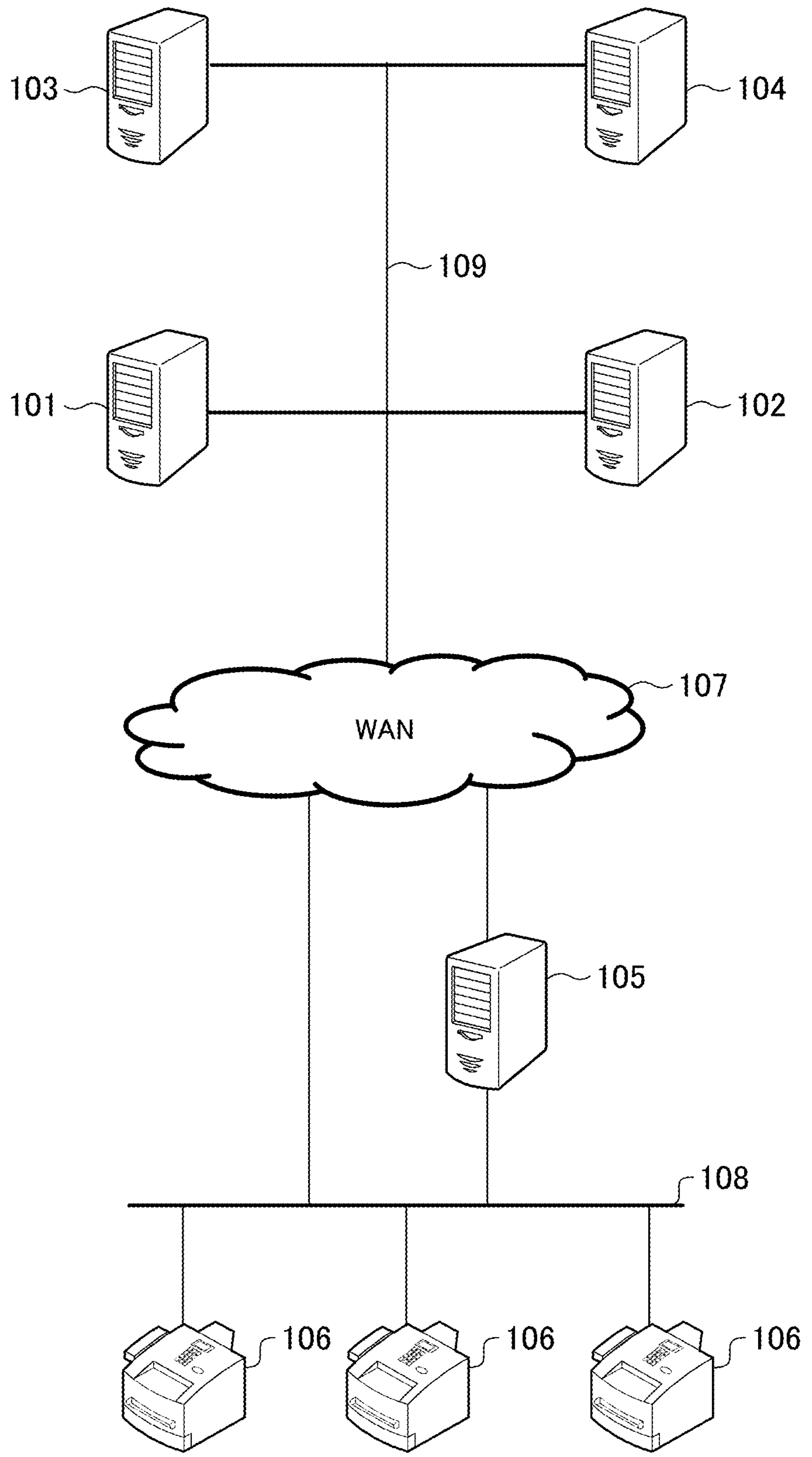
FIG. 1 is a diagram that explains an overall configuration of a system that performs device management.

FIG. 1 is a diagram that explains an overall configuration of a device management system that performs device management. In the present embodiment, an example in which the device management service manages an image forming device 106 serving as a network device will be explained. The device management system includes the image forming device 106 that is a management target, a monitoring device 105 that is a relay device, and a server group that provides a device management service to the image forming device 106 via a network. A plurality of image forming devices 106 may be provided. These are connected via a network.

The image forming device 106 is a network device that receives various services from a system server group. The image forming device 106 is, for example, a multifunction peripheral (MFP) having a printing function and a scanning function. The image forming device 106 receives print data that has been received via the network by the printing function, and performs printing on an actual sheet and the like by using a known printing technology including an electrophotographic technology and an inkjet technology. The image forming device 106 reads a paper document via a scanner and converts the paper document into image data by a scan function. Note that the network devices may be any devices capable of communication, and may be, for example, a single-function printer having only a print function, a scanner, a 3D printer, a laptop, a smartphone, a smart home appliance, and the like.

The monitoring device 105 monitors the image forming device 106, which is a network device, via a network. The monitoring device 105 is connected between the server group and the image forming device 106. The monitoring device 105 collects data from the image forming device 106 and transmits the data to the server. Additionally, the monitoring device 105 according to the present embodiment has a proxy server function, and also functions as a relay device that relays communication between the image forming device 106 and the server group. Note that some of the image forming devices 106 to be managed by the device management service may function as the monitoring device 105.

The server group manages the data collected by the monitoring device 105 and the image forming device 106 and the monitoring device 105 to be managed, and provides a device management service. The server group according to the present embodiment has, for example, a device management server 101, an authentication/authorization server 102, a resource server 103, and a service providing server 104. The device management server 101 is an information processing apparatus that manages information on the monitoring device 105 and the image forming device 106 and to which various services are to be provided.

The authentication/authorization server 102 is an information processing apparatus that provides an authentication/authorization function for safely connecting the image forming device 106 and the monitoring device 105 to various servers. The authentication/authorization server 102 performs authentication/authorization by using, for example, a typical OAuth mechanism. The authentication/authorization server 102 registers each device (the image forming device 106 and the monitoring device 105) as a client associated with a specific tenant, and issues a token to the client. Each device (the image forming device 106 and the monitoring device 105) accesses various servers by using the issued token.

The resource server 103 is an information processing apparatus that manages information collected from the image forming device 106, which is mainly required to provide a service. The service providing server 104 provides various services such as a maintenance service and a reporting service based on various kinds of information of the image forming device 106 managed by the resource server 103. Note that the function of the server group may be realized by one or more information processing apparatuses, a virtual machine (cloud service) using resources provided by a datacenter including the information processing apparatus, or a combination thereof.

The server group (the device management server 101, the authentication/authorization server 102, the resource server 103, and the service providing server 104) is connected to a local area network (LAN) 109. The image forming device 106 and the monitoring device 105 are connected to a LAN 108. A LAN 109 and the LAN 108 are connected to a WAN (Wide Area Network) 107. Thus, the server group, the monitoring device 105, and the image forming device 106 are connected via the network. Note that the network may have any communication method as long as data transmission and reception can be performed. For example, the network may be configured by any one of a LAN, a WAN, a cellular network such as an LTE or a 5G network, a wireless network, a telephone line, a dedicated digital line, and the like, or a combination thereof.

Figure 2:
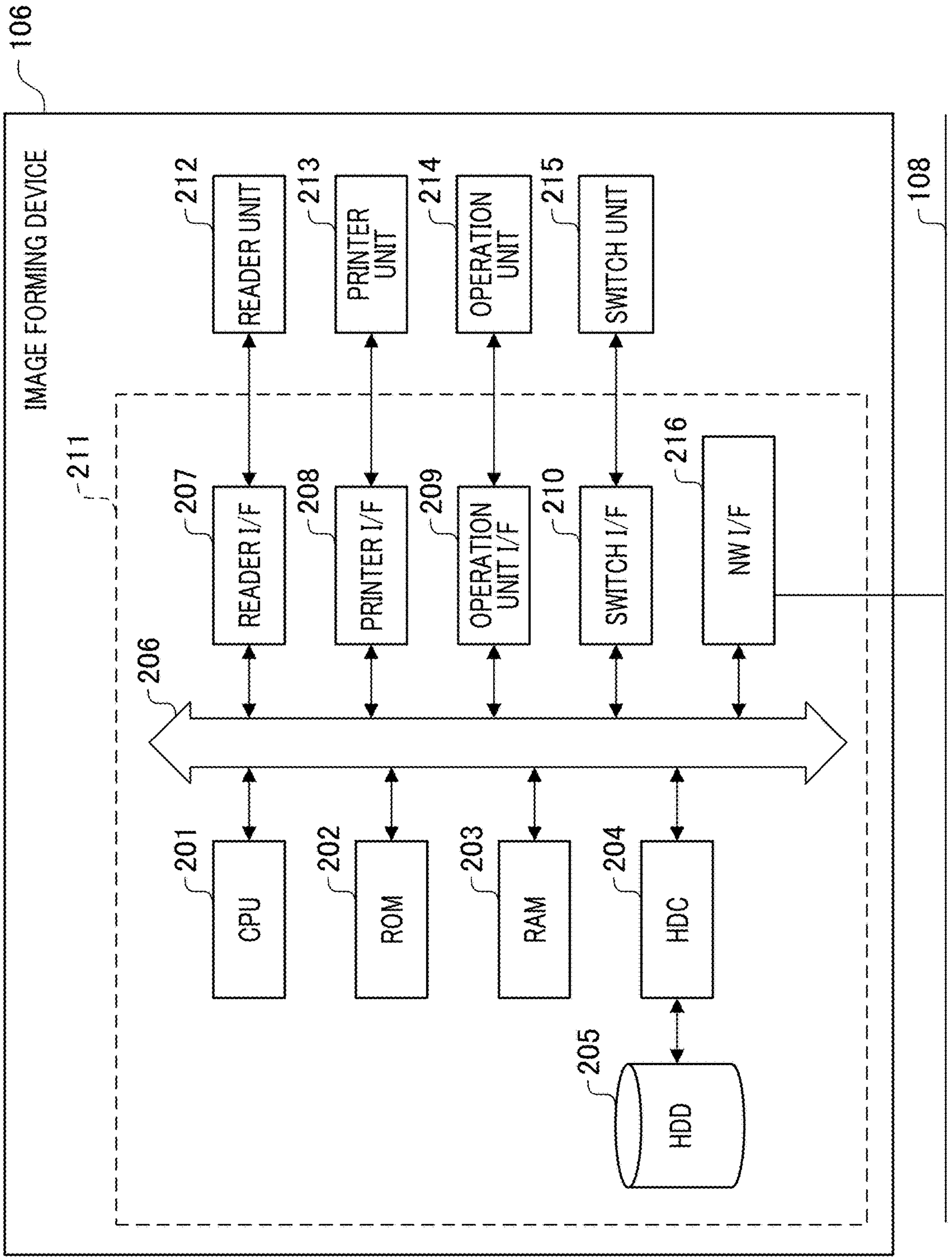
FIG. 2 is a diagram illustrating an example of a hardware configuration of the image forming apparatus.

FIG. 2 is a diagram illustrating an example of a hardware configuration of the image forming device 106. The image forming device 106 includes an overall control unit 211, a reader unit 212, a printer unit 213, an operation unit 214, and a switch unit 215. The overall control unit 211 has a CPU 201, a ROM 202, a RAM 203, an HDC 204, an HDD 205, a reader I/F 207, a printer I/F 208, an operation unit I/F 209, a switch I/F 210, and an NW I/F 216. The CPU 201, the ROM 202, the RAM 203, the HDC 204, the reader I/F 207, the printer I/F 208, the operation unit I/F 209, the switch I/F 210, and the NW I/F 216 are connected via a system bus 206.

The central processing unit (CPU) 201 integrally controls the entire image forming device 106. The CPU 201 comprehensively controls each device connected to the system bus 206 by executing software that controls the image forming device 106 stored in the ROM 202 or the HDD 205. The read only memory (ROM) 202 is a data readout-only memory, and stores, for example, a basic control program of the image forming device 106. The random access memory (RAM) 203 is a memory capable of reading out/writing data. The RAM 203 functions as, for example, a work area of the CPU 201.

The hard disk controller (HDC) 204 controls the HDD 205. The hard disk drive (HDD) 205 is an example of a storage unit, and stores various programs, data, and the like. Note that, although in the present embodiment, an example in which the image forming device 106 includes the HDD 205 serving as a storage unit will be explained, the present invention is not limited thereto, and for example, another storage unit, for example, an SSD and a DiskDrive in which an external medium is loaded may be used.

The reader I/F 207 is an interface that connects the reader unit 212 and the system bus 206, and controls the reader unit 212. The reader unit 212 reads a document as an image and generates image data. The generated image date is used for various kinds of processing such as output to the printer unit 213, storage in the HDD 205, and transmits image data to a host computer connected to the network 217 via the network I/F 216 according to an instruction from the user.

The printer I/F 208 is an interface that connects the printer unit 213 and the system bus 206, and controls the printer unit 213. The printer unit 213 prints a document read by the reader unit 212 or an image data stored in the HDD 205 on a recording material (for example, a sheet). Additionally, the printer unit 213 receives a print job from a host computer connected to the network 217 via the network I/F unit 216 and prints the image data based on the print job.

The operation unit I/F 209 is an interface that connects the operation unit 214 and the system bus 206, and controls the operation unit 214. The operation unit I/F 209 controls display on the operation unit 214 and user input from the operation unit 214. The operation unit 214 performs display to the user and reception of an operation from the user. The operation unit 214 may be configured by, for example, a display and buttons for operation, or may be configured by a touch panel. By associating the input coordinates and the display coordinates on the touch panel, it is possible to configure a GUI as if the user can directly operate the screen displayed on the touch panel.

The switch I/F 210 is an interface that connects the switch unit 215 and the system bus 206, and controls the switch unit 215. The switch unit 215 has a switch for operating a power ON/OFF state of the image forming device 106, and the like. The network (NW) I/F 216 is a communication interface that connects the image forming device 106 and a network (for example, the LAN 108). The CPU 201 communicates with another information device on the network via the NW I/F 216 and the network.

Figure 3:
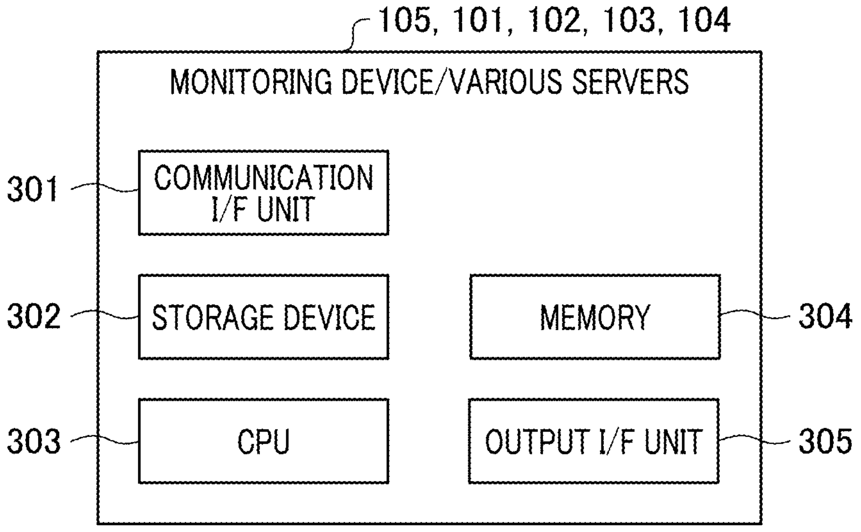
FIG. 3 is a diagram illustrating an example of a hardware configuration of a monitoring apparatus and the management server.

FIG. 3 is a diagram illustrating an example of a hardware configuration of the monitoring device 105. Additionally, the server group (the device management server 101, the authentication/authorization server 102, the resource server 103, and the service providing server 104) also has the hardware configuration similar to that of the monitoring device 105. The monitoring device 105 has a hardware configuration similar to that of a typical information processing apparatus, and includes a CPU 303, a memory 304, a storage unit 302, an operation I/F 305, and a communication I/F 301.

The CPU 303 of the monitoring device 105 controls the entire monitoring device 105. The CPU 303 loads a program from the storage unit 302 into the memory 304, and executes the program to realize various types of control. The storage unit 302 stores an operating system (OS), a program, management data, and data collected from external systems, devices, and the like. The memory 304 functions as a work area and the like of the CPU 303. The operation I/F 305 outputs an execution result of various data, and programs, and the like to an output device such as a display connected thereto, and receives an input from an input device connected thereto. The communication I/F 301 is a network interface for communicating with an external system and a device. The communication I/F 301 of the monitoring device 105 is connected to, for example, the WAN 107 and the LAN 108.

Figure 4:
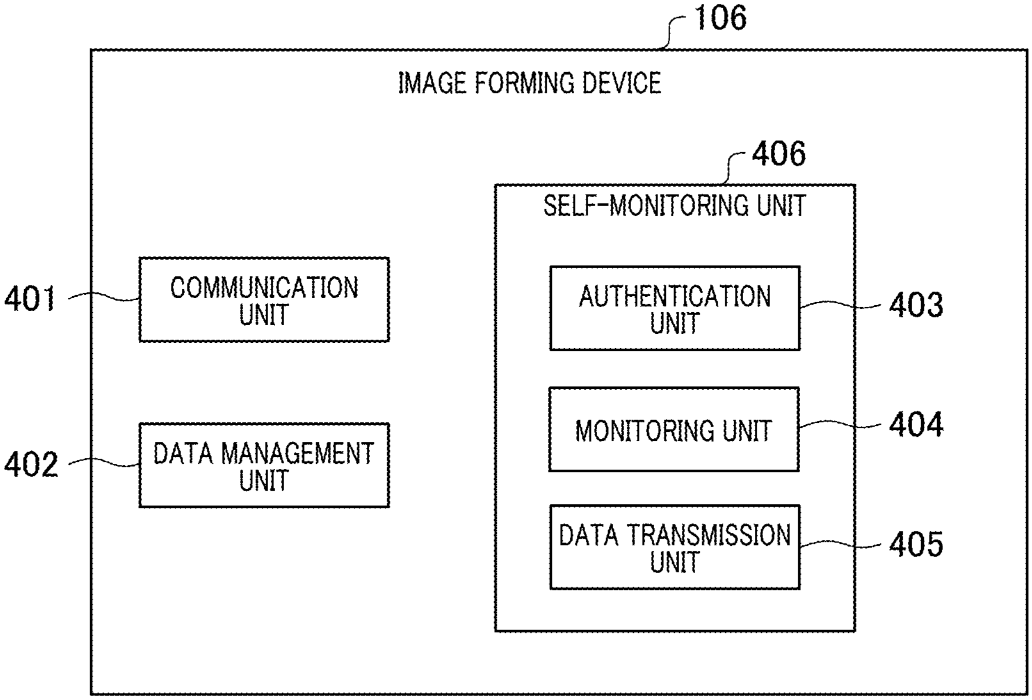
FIG. 4 is a diagram illustrating an example of a software configuration of the image forming apparatus.

FIG. 4 is a diagram illustrating an example of a software configuration of the image forming device 106. The image forming device 106 has a communication unit 401 and a data management unit 402. The communication unit 401 communicates with an external device, for example, the monitoring device 105. The data management unit 402 manages basic information, various kinds of operation information, and the like of the device. The basic information of the device includes, for example, a device name, a serial number, and a product name. The various types of operation information include, for example, the number of printed sheets, the remaining amount of ink, and error information.

The image forming device 106 having the self-monitoring function has a self-monitoring unit 406. The self-monitoring function is a function of monitoring the local device, collecting operation information necessary for the device management service in the local device, and transmitting the operation information to various servers that provide the device management service. The self-monitoring unit 406 has an authentication unit 403, a monitoring unit 404, and a data transmission unit 405. The authentication unit 403 communicates with the authentication/authorization server 102 to perform registration processing as a client, acquisition and management of a token, and the like. Additionally, the authentication unit 403 communicates with the monitoring device 105 regarding settings necessary for monitoring, including a registration instruction to the authentication/authorization server 102. The monitoring unit 404 collects data necessary for self-monitoring. The data transmission unit 405 transmits the data collected by the monitoring unit 404 to the resource server 103.

Figure 5:
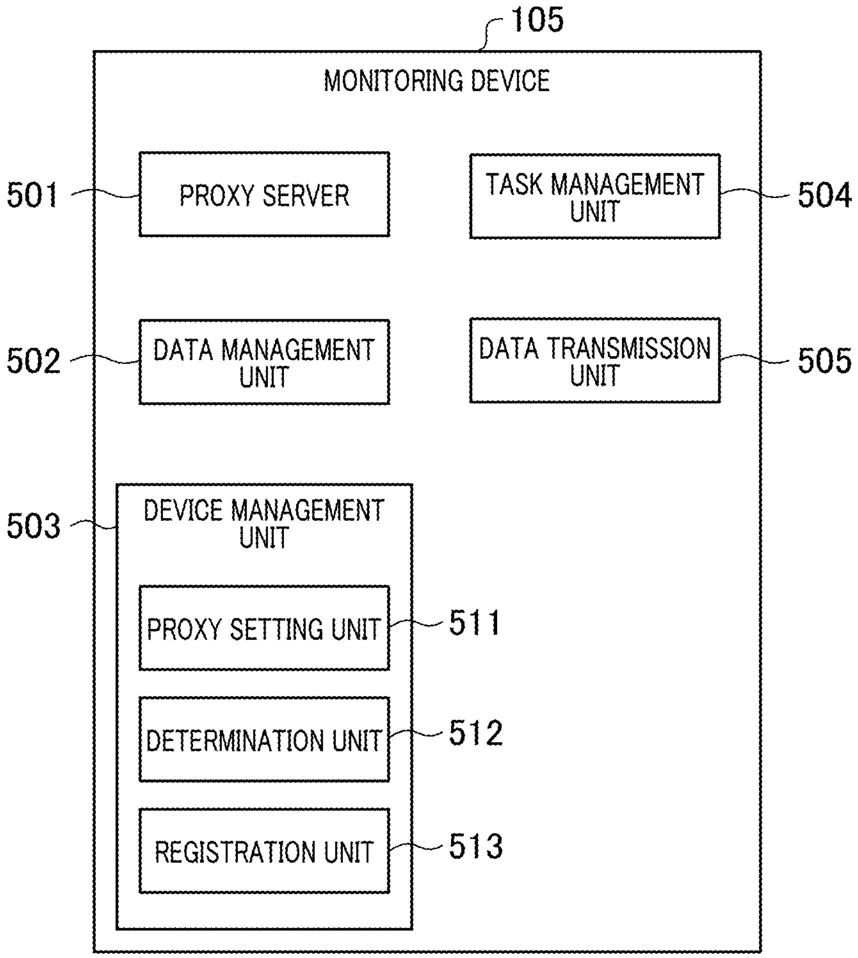
FIG. 5 is a diagram illustrating an example of a software configuration of the monitoring apparatus.

FIG. 5 is a diagram illustrating an example of a software configuration of the monitoring device 105. The monitoring device 105 has a proxy server 501, a data management unit 502, a device management unit 503, a task management unit 504, and a data transmission unit 505. The proxy server 501 aggregates communication from the image forming device 106 having a self-monitoring function, and relays communication between the image forming device 106 and the device management service. The data management unit 502 manages device information necessary for monitoring devices. For example, the data management unit 502 manages status information indicating whether or not the device is a management target of the device itself. The data management unit 502 also manages monitoring data and the like that have been acquired from the image forming device 106 that does not have a self-monitoring function.

As a mechanism in which the server group acquires the data of the device, there are a method in which the monitoring device 105 collects data from the image forming device 106 by periodic polling and transmits the data to the server group, and a method in which the monitoring device 105 serves as a proxy server and collects data from the image forming device 106. The monitoring device 105 has a proxy mode and a polling mode as monitoring modes. In the polling mode, the monitoring device acquires data from the image forming device 106 by periodic polling, transmits the acquired information to the server in the server group, and manages the device. In the proxy mode, the monitoring device 105 functions as a proxy server that relays communication between the image forming device 106 having a self-monitoring function and the server group.

The device management unit 503 performs setting of proxy server information held by the device management unit 503 itself, registration instructions, and the like to the image forming device 106 having a self-monitoring function. Additionally, the device management unit 503 registers the image forming device 106 in the device management service (for example, the authentication/authorization server 102) on behalf of the image forming device 106 not having a self-monitoring function. The device management unit 503 has a proxy setting unit 511, a determination unit 512, and a registration unit 513. The proxy setting unit 511 performs proxy setting by using proxy information of the proxy server function for a device that is caused to use the proxy server 501. The proxy setting unit 511 according to the present embodiment performs proxy setting on the image forming device 106 having a self-monitoring function. The determination unit 512 determines whether or not to execute re-registration processing of the image forming device 106 in the device management service. The determination unit 512 determines whether or not the image forming device 106 is a target of the re-registration processing based on whether or not the image forming device 106 has a self-monitoring function for the device management service. The task management unit 504 manages various tasks of the monitoring device 105 such as monitoring and registration of the image forming device 106. The data transmission unit 505 transmits monitoring data and the like that have been acquired from the image forming device 106 that does not have a self-monitoring function, which is held by the data management unit 502, to the resource server 103.

Figure 15:
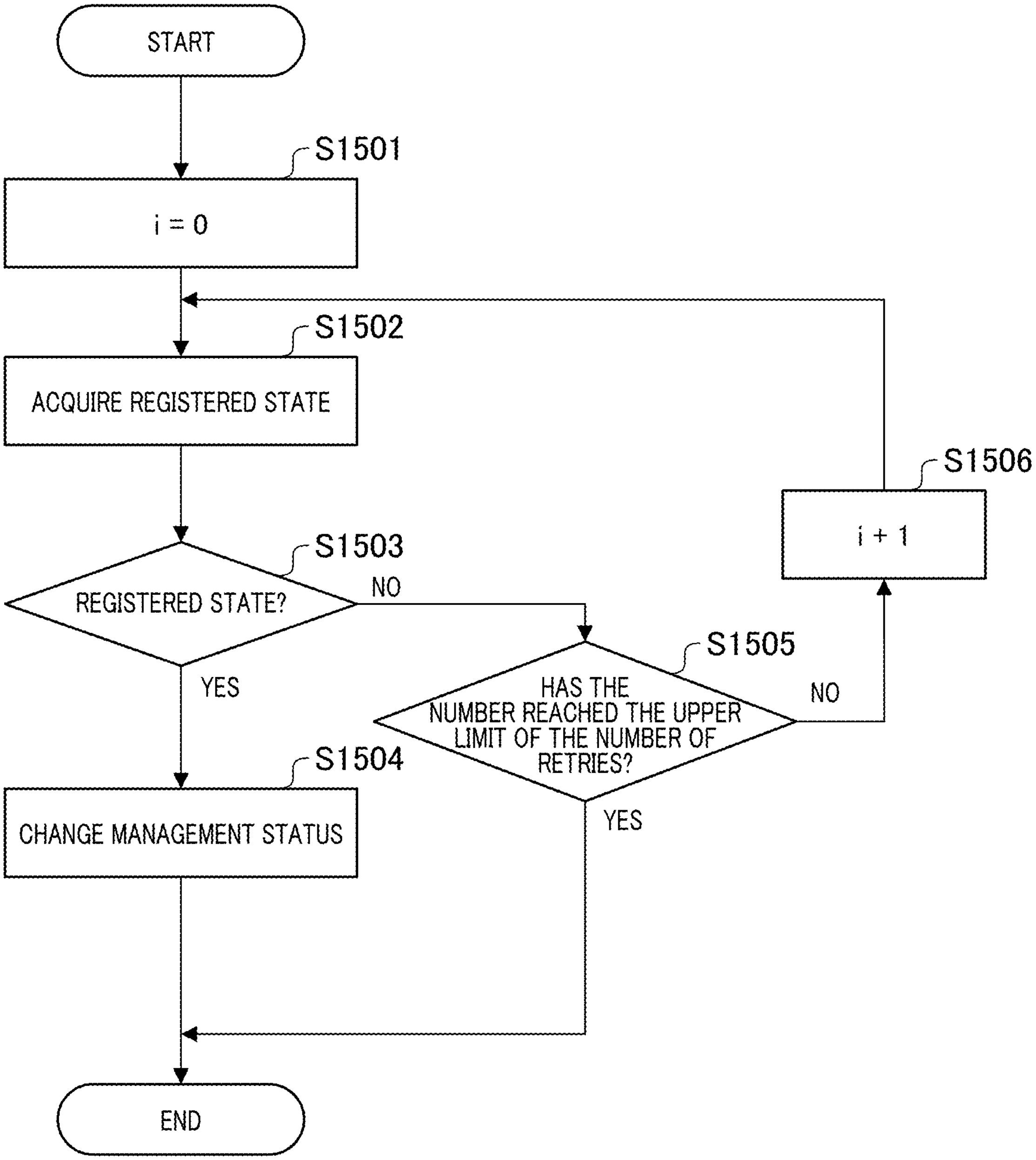
FIG. 15 is a flowchart illustrating an example of device registration state confirmation processing of the monitoring apparatus.
Figure 16:
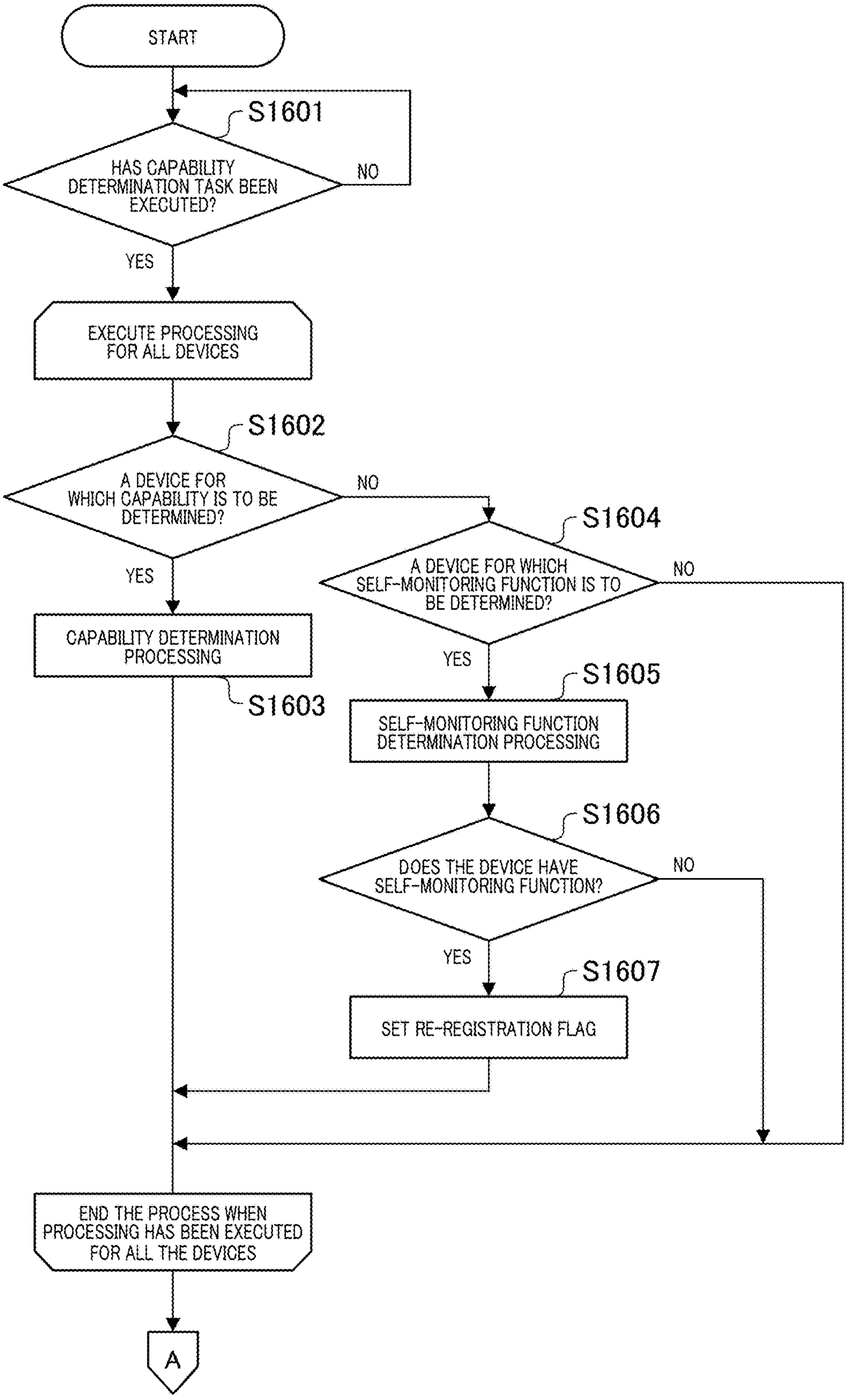
FIG. 16 is a flowchart illustrating an example of re-registration determination processing of the image forming apparatus.
Figure 17:
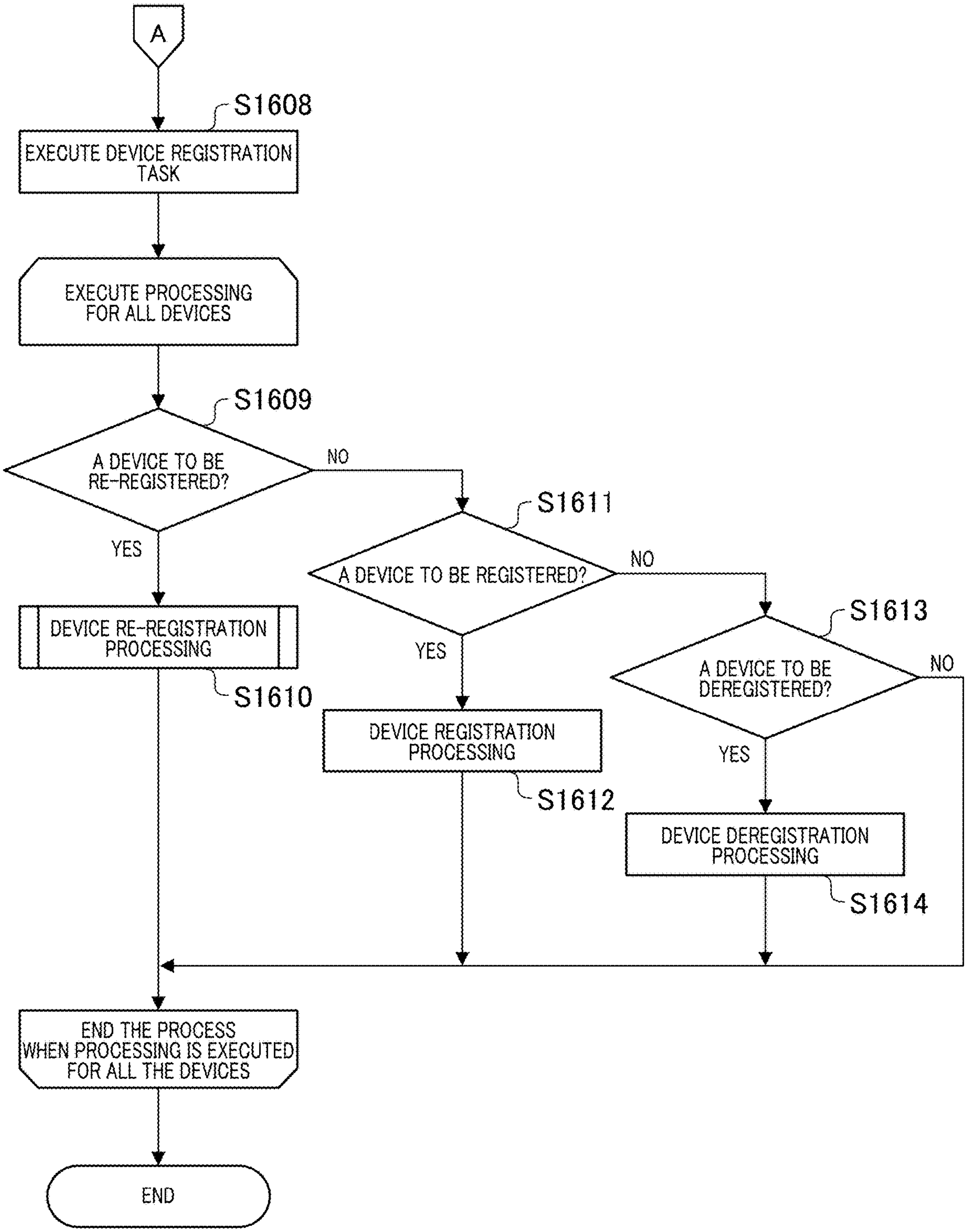
FIG. 17 is a flowchart illustrating an example of the re-registration determination processing of the image forming apparatus.

Processing for registering the image forming device 106 in the device management service will be explained with reference to FIG. 15 to FIG. 17. In the registration processing, each process executed by the image forming device 106 is realized by the CPU 201 of the image forming device 106 executing a program stored in a memory (ROM 202 or HDD 205). Each process executed by the monitoring device 105 is realized by the CPU 303 of the monitoring device 105 executing a program stored in the memory 304. Each process executed by the device management server 101 is realized by the CPU 303 of the management server 101 executing a program stored in the memory 304. Each process executed by the authentication/authorization server 102 is realized by the CPU 303 of the authentication/authorization server 102 executing a program stored in the memory 304.

Figure 6:
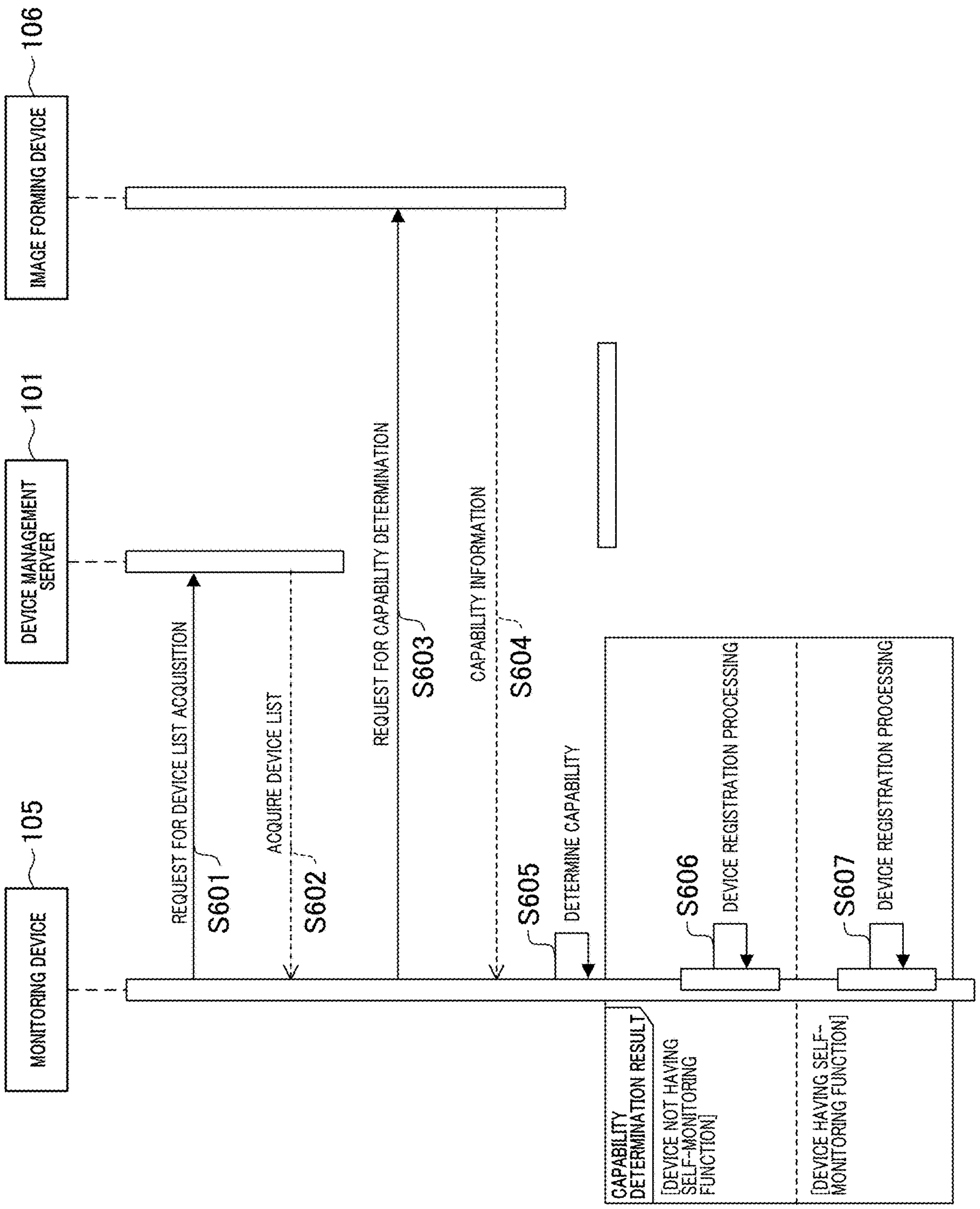
FIG. 6 is a sequence diagram illustrating an example of the registration determination processing of the image forming apparatus.

In the present embodiment, the registration processing to the device management service and the monitoring mode of the monitoring device 105 are different depending on whether or not the image forming device 106 has a self-management function. Accordingly, in the registration processing of the image forming device 106 to the device management service, first, a capability determination is performed about whether or not the image forming device 106 has a self-management function. FIG. 6 is a sequence diagram illustrating the capability determination processing of the image forming device 106. Here, it is assumed that devices to be managed by the monitoring device 105 are managed in advance by the device management server 101.

In S601, the device management unit 503 of the monitoring device 105 requests the device management server 101 to acquire the management target device list of the monitoring device 105. The device management server 101 has a management target device list in which devices to be managed by the monitoring device 105 are listed in advance. In S602, the device management server 101 transmits the management target device list of the monitoring device 105 to the monitoring device 105 as a response to the request to acquire the management target device list. As a result, the device management unit 503 of the monitoring device 105 acquires the management target device list of the monitoring device 105 from the device management server 101.

In S603, the device management unit 503 of the monitoring device 105 requests the devices in the management target device list to determine their capabilities. In the present embodiment, the device management unit 503 of the monitoring device 105 requests the communication unit 401 of the image forming device 106 to determine the capability of the image forming device 106. In the determination of capability, it is determined whether or not the image forming device 106 has a self-monitoring function, and whether or not the monitoring target data can be acquired if the image forming device 101 does not have a self-monitoring function.

In S604, the data management unit 402 of the image forming device 106 transmits information used for determining the capability of the device to the device management unit 503 of the monitoring device 105 via the communication unit 401. Examples of the information used in the determination of device capability include the presence or absence of a predetermined service and module, and version information of firmware. In S605, the determination unit 512 of the monitoring device 105 determines the capabilities of the devices based on the information acquired from the devices. First, the determination unit 512 determines whether or not the image forming device 106 has a self-monitoring function. For example, the determination unit 512 determines whether or not a device has a self-monitoring function according to whether or not a service having a self-monitoring function is present. In this case, in a case where a service having a self-monitoring function is present, the device is determined to have a self-monitoring function. In a case where the device does not have a self-monitoring function, the determination unit 512 determines whether or not the monitoring device 105 is a device that can perform monitoring. For example, the determination unit 512 determines whether or not the device can perform monitoring based on whether or not the device can collect monitoring target data and transmit the monitoring target data to the monitoring device 105. Note that the method of determining the capability of the device is not limited thereto, and another method may be used. Note that whether or not the device has a self-monitoring function may be determined on the device side, and the determination result may be returned to the monitoring device 105.

The monitoring device 105 provides an instruction of registration processing according to the determination result. In the case of a device having a self-monitoring function, the monitoring device 105 executes the registration processing for a device having a self-monitoring function in S607. If the device is a device that does not have a self-monitoring function but can be monitored, the monitoring device 105 executes the registration processing for a device that does not have a self-monitoring function in S606. Note that if the device does not have a self-monitoring function and cannot perform monitoring, the device is not registered in the monitoring device 105, and the process ends.

Figure 7:
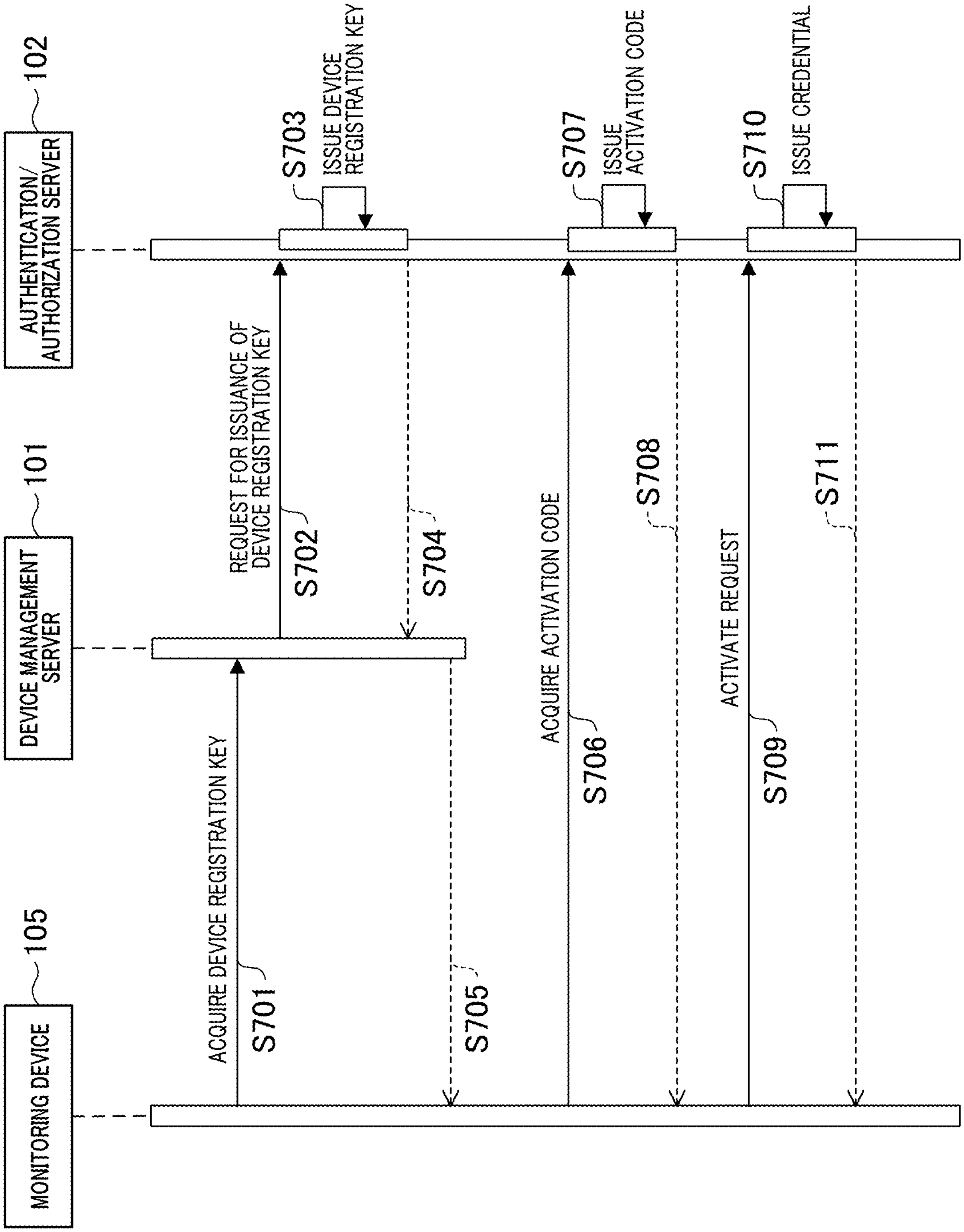
FIG. 7 is a sequence diagram illustrating an example of registration processing of an image forming apparatus having no self-monitoring function.

Next, in step S606, the registration processing of an image forming device that does not have a self-monitoring function will be explained. FIG. 7 is a sequence diagram illustrating the registration processing for an image forming device that does not have a self-monitoring function. In the present embodiment, the image forming device 106 to be managed is registered in the authentication/authorization server 102 by using a device registration key. The device registration key is information necessary for registration of the image forming device 106 to be managed in the authentication/authorization server 102 of the device management service.

In S701, the device management unit 503 of the monitoring device 105 requests the device management server 101 to acquire a device registration key. The device registration key acquisition request includes device identification information of the device to be registered and the token of the monitoring device 105. In the present embodiment, information for the device management server 101 to uniquely identify the image forming device 106 (hereinafter, referred to as a "device management service device ID"), which serves as device identification information, is added to the device registration key acquisition request. The device management service device ID is managed as a part of the device management information in the data management unit 502.

An example of the device management information managed by the data management unit 502 of the monitoring device 105 will be explained below with reference to FIG. 8. FIG. 8 is a diagram illustrating an example of a device management information table. The device management information includes, for example, a device ID 801, a serial number 802, an IP address 803, a management state 804, a registration state 805, a monitoring type 806, a re-registration flag 807, and a device management service device ID 808.

The device ID 801 is information for uniquely identifying devices in the system. The serial number 802 is information for uniquely identifying devices set at the time of shipment of the devices. The IP address 803 is information indicating an IP address of the device. The management state 804 is information indicating whether or not the device is a management target of the device management system. Here, it is determined that the image forming device 106 included in the management target device list that has been acquired from the device management server 101 in S602 is to be a managed. The registration state 805 is information indicating whether or not the image forming device 106 to be managed has been registered in the device management service.

The monitoring type 806 is information indicating in what kind of monitoring mode monitoring is performed. For example, if the image forming device 106 has a self-monitoring function, monitoring is performed via a proxy of the monitoring device 105. Accordingly, "Proxy" is stored in the monitoring type 806 of the image forming device 106 having a self-monitoring function. If the image forming device 106 does not have a self-monitoring function, monitoring is performed by collecting monitoring data from the monitoring device 105 by periodic polling. Accordingly, "Polling" is stored in the monitoring type 806 of the image forming device 106 that does not have a self-monitoring function. Then, in the case of a device that does not have monitorable capability information or for which capability determination has not been performed, information indicating this (example: "Unknown") is stored in the monitoring type 806.

The re-registration flag 807 is information indicating whether or not a device registered as a device having no self-monitoring function is to be re-registered as a device having a self-monitoring function. For example, "1" is stored in the re-registration flag 807 if a device that does not have a self-monitoring function is re-registered as a device that has a self-monitoring function, and "0" is stored in other cases. The device management service device ID 808 is information for the device management server 101 to uniquely identify the image forming device 106. Note that the device management information is not limited thereto, and may include other information.

The description returns to the explanation of FIG. 7. In S702, the device management server 101 verifies the token of the monitoring device 105 included in the received device registration key acquisition request and the device identification information of the device to be registered, and then performs a device registration key issuance request to the authentication/authorization server 102. The device management service device ID is included in the device registration key issuance request. Specifically, first, the device management server 101 performs token verification of the monitoring device 105 included in the device registration key acquisition request. After the token verification, the device management server 101 confirms whether or not the image forming device 106 is a device managed on the device management server 101 based on the device management service device ID.

In this context, information managed by the device management server 101 will be explained below with reference to FIGS. 9A and 9B. FIG. 9A is a diagram illustrating an example of a device management table managed by the device management server 101. In the device management table, information on devices that are targets of services provided by the device management server 101 is managed. The device management table includes, for example, a device ID 901, a serial number 902, a tenant ID 903, an agent ID 904, and a status 905.

The device ID 901 is the device management service device ID 901. The device ID 901 is the information that is the same as a client ID in a client management table managed by the authentication/authorization server 102, which will be described below. The serial number 902 is information for uniquely identifying the device. The tenant ID 903 is information for identifying tenants to which the devices belongs. The agent ID 904 is information for identifying an agent associated with the device. The status 905 is information indicating a valid/invalid state of the device.

FIG. 9B is a diagram illustrating an example of an agent management table managed by the device management server 101. In the agent management table, information on an agent that has made a contract for a service provided by the device management server 101 is managed. In the agent management table, for example, an agent ID 906, a tenant ID 907, a client ID 908, and a status 909 are included.

The agent ID 906 is information for uniquely identifying the monitoring device 105 by the device management server 101. The tenant ID 907 is information for identifying a tenant to which the agent belongs. The client ID 908 is a client ID of the client management table managed by the authentication/authorization server 102. The status 909 is information indicating a valid/invalid state of the agent.

The timing at which the information is registered in the device management table or the agent management table of the device management server 101 is, for example, a timing at which a device to which the service is to be provided is instructed from the service providing server 104. As a method of instructing the target device, for example, the instruction may be performed from a web UI of the service providing server 104, or a web API may be used.

The description returns to the explanation of FIG. 7. After confirming that the device corresponding to the device management-service device ID is managed in the device management table, the device management server 101 requests the authentication/authorization server 102 to issue a device registration key (S702). In S703, the authentication/authorization server 102 confirms whether or not the device to be registered is managed on the authentication/authorization server 102, and issues a device registration key. First, the authentication/authorization server 102 confirms whether or not the device is managed in the client management table based on the device management service ID included in the device registration key issuance request.

Here, information managed by the authentication/authorization server 102 will be explained. FIG. 10 is a diagram illustrating an example of a client management table managed by the authentication/authorization server 102. In the client management table, for example, a client ID 1001, a serial number 1002, a tenant ID 1003, and a status 1004 are included. The client ID 1001 is information for the authentication/authorization server 102 to uniquely identify devices. The client ID 1001 is information that is the same as the device IDs managed by the device management server 101 in the device management table, and is different information from the client ID 908 managed by the device management server 101 in the agent management table. The serial number 1002 is information for uniquely identifying devices. The tenant ID 1003 is information for identifying tenants to which devices belong. The status 1004 is information indicating a valid/invalid state of the client.

The authentication/authorization server 102 issues the device registration key after confirming that the device is managed in the client management table based on the device management service ID included in the device registration key issuance request. Then, the authentication/authorization server 102 issues and stores the device registration key in a device registration key management table. Here, a device registration key management table for managing the issued device registration key will be explained. FIG. 11 is a diagram illustrating an example of the device registration key management table managed by the authentication/authorization server 102. In the device registration key management table, for example, a device registration key 1101, a tenant ID 1102, and an expiration date 1103 are included.

The device registration key 1101 is information for uniquely identifying device registration keys. The tenant ID 1102 is information for uniquely identifying tenants, and the device registration key is issued for each tenant. Note that a plurality of device registration keys can be issued even for the same tenant, and if a plurality of devices is present in one tenant, device registration keys can be issued for each device. The expiration date 1103 is information indicating expiration date information of the device registration key.

The description returns to the explanation of FIG. 7. The device registration key issued in S703 is transmitted to the monitoring device 105, which is the source of the request to acquire the device registration key, via the device-management server 101. In S704, the authentication/authorization server 102 transmits the device registration key issued in S703 to the device management server 101. In S705, the device management server 101 transmits the device registration key that has been received from the authentication/authorization server 102 to the monitoring device 105.

In S706, the device management unit 503 of the monitoring device 105 carries out an activation code acquisition request on the authentication/authorization server 102. The activation code acquisition request includes the acquired device registration key and the serial number of the device. In S707, the authentication/authorization server 102 issues the activation code in response to the activation code acquisition request. First, the authentication/authorization server 102 confirms the validity of the device registration key by using the client management table and the device registration key management table based on the serial number and the device registration key included in the activation code acquisition request. In addition, in a case where the device registration key is valid, the authentication/authorization server 102 issues an activation code and stores the activation code in the activation code management table.

Here, an activation code management table for managing activation codes will be explained. FIG. 12 is an example of the activation code management table managed by the authentication/authorization server 102. In the activation code management table, for example, an activation code 1201, a serial number 1202, a device registration key 1203, and an expiration date 1204 are included. The activation code 1201 is a code that is issued for each device and is necessary to activate the client. The serial number 1202 is information for uniquely identifying devices. The device registration key 1203 is information for uniquely identifying device registration keys. The expiration date 1204 is information indicating expiration date information of the activation code.

The description returns to the explanation of FIG. 7. In S708, the authentication/authorization server 102 transmits the activation code issued in S707 to the monitoring device 105 that is the request source of the activation code acquisition request. In S709, the device management unit 503 of the monitoring device 105 performs an activation request to the authentication/authorization server 102. The activation request includes the device registration key, the activation code, and the serial number of the device.

In S710, the authentication/authorization server 102 issues a credential in response to an activation request. First, the authentication/authorization server 102 confirms the validity of the activation code. The authentication/authorization server 102 confirms the validity of the activation code based on the serial number, the device registration key, and the activation code included in the activation request, the client management table, and the activation code management table. If the activation code is determined to be valid, the authentication/authorization server 102 issues a credential and stores the credential in the credential management table. Then, the authentication/authorization server 102 that has stored the credential updates the status information managed on the client management table to valid and stores the updated status information.

Here, a credential management table for managing credentials will be explained. FIG. 13 is a diagram illustrating an example of a credential management table managed by the authentication/authorization server 102. The credential management table includes, for example, a client ID 1301 and a credential 1302. The client ID 1301 is information for uniquely identifying clients (devices). The client ID 1301 is information that is the same as the client ID 1001 and the device ID 901 managed by the device management server 101, and is different information from the client ID 908 managed in the agent management table by the device management server 101. The credential 1302 is secret key information required when a token is acquired.

The description returns to the explanation of FIG. 7. In S711, the authentication/authorization server 102 transmits the credential issued in S710 to the monitoring device 105 that is the request source of the activation request. As a result, the client of the image forming device 106, which is a device to be registered, is valid, and the monitoring device 105 can collect monitoring data of the image forming device 106, and transmit the monitoring data to the resource server 103.

Figure 14:
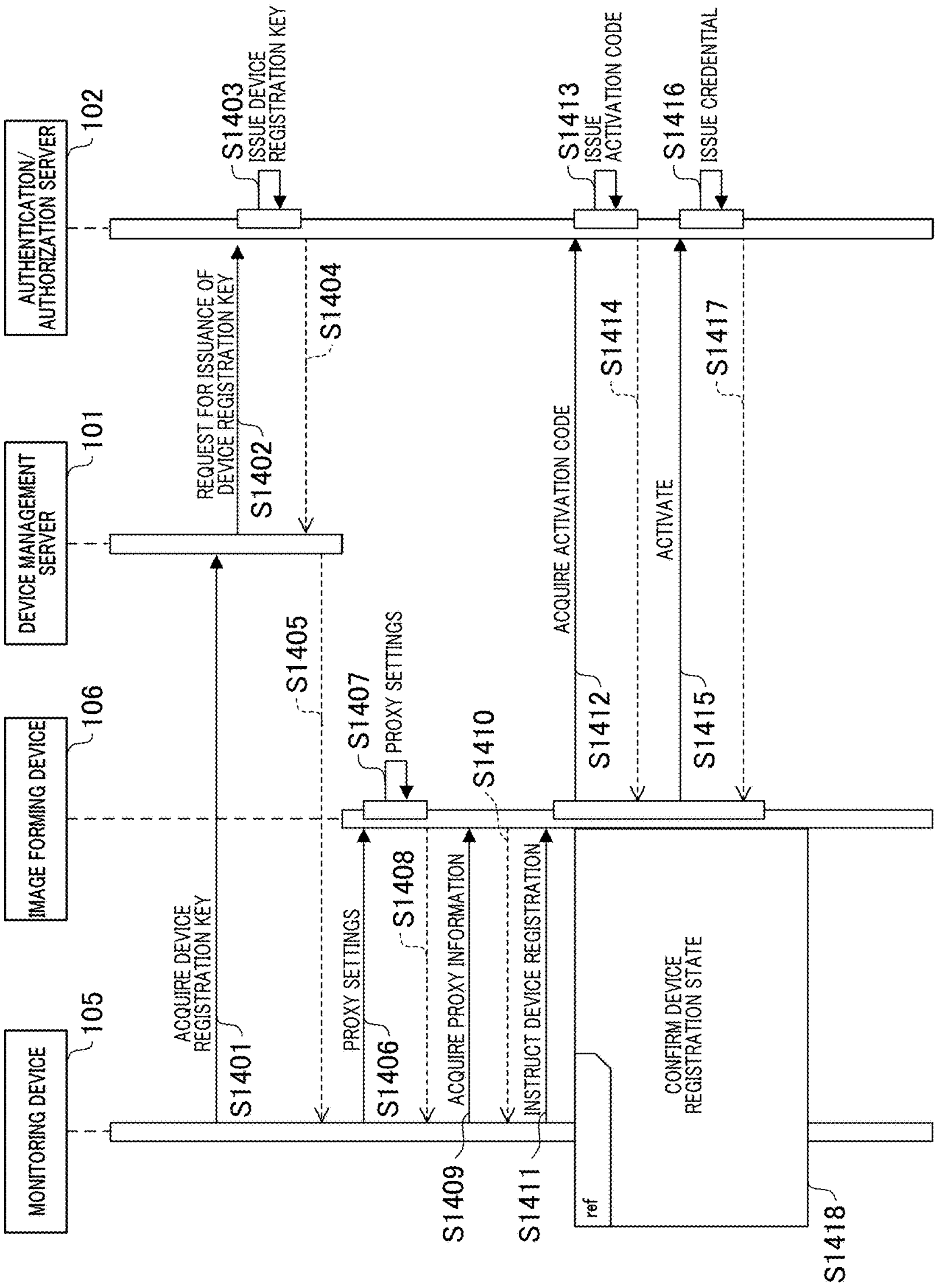
FIG. 14 is a sequence diagram showing an example of registration processing of the image forming apparatus having a self-monitoring function.

Next, the registration processing of the image forming device having a self-monitoring function will be explained. FIG. 14 is a sequence diagram showing an example of registration processing of the image forming device having a self-monitoring function. In S1401, the device management unit 503 of the monitoring device 105 requests the device management server 101 to acquire a device registration key. The device registration key acquisition request includes the device identification information of the image forming device 106 to be registered. The device identification information is a device management service device ID included in the management target device list. The device management service device ID is managed as part of the device management information in the data management unit 502. The device registration key is information necessary when the image forming device 106 is registered in the authentication/authorization server 102 of the device management service.

In S1402, the device management server 101 verifies the token of the monitoring device 105 included in the received device registration key acquisition request and the device identification information of the device to be registered, and then requests the authentication/authorization server 102 to issue a device registration key. The device management service device ID is included in the device registration key issuance request. Specifically, first, the device management server 101 performs token verification of the monitoring device 105 included in the device registration key acquisition request. After the token verification has been performed, the device management server 101 confirms whether or not the image forming device 106 is a device managed on the device management server 101 based on the device management service device ID. After confirming that the image forming device 106 is managed in the device management table, the device management server 101 requests the authentication/authorization server 102 to issue a device registration key.

In S1403, the authentication/authorization server 102 confirms whether or not the image forming device 106 is managed on the authentication/authorization server 102, and issues a device registration key. First, the authentication/authorization server 102 confirms whether or not the image forming device 106 is managed in the client management table based on the device management service ID included in the device registration key issuance request. The authentication/authorization server 102 issues a device registration key after confirming that the image forming device 106 is managed in the client management table.

The device registration key issued in S1403 is transmitted to the monitoring device 105, which is the source of the device registration key acquisition request, via the device management server 101. In S1404, the authentication/authorization server 102 transmits the device registration key issued in S1403 to the device management server 101. In S1405, the device management server 101 transmits the device registration key received from the authentication/authorization server 102 to the monitoring device 105.

In S1406, the proxy setting unit 511 of the device management unit 503 of the monitoring device 105 transmits proxy information of the proxy server 501 of the monitoring device 105 to the authentication unit 403 of the image forming device 106. The proxy information is access information to a proxy function for causing the image forming device 106 to use the proxy server 501. In S1407, the data management unit 402 of the image forming device 106 sets and stores the proxy information of the proxy server 501 acquired in S1404. In S1408, the image forming device 106 transmits the completion of the setting of the proxy information to the monitoring device 105.

In S1408, the device management unit 503 of the monitoring device 105 requests the authentication unit 403 of the image forming device 106 to acquire the proxy information set in S1407. In S1409, the image forming device 106 transmits the requested proxy information to the monitoring device 105. In addition, the monitoring device 105, which has newly acquired the proxy information set in S1407 from the image forming device 106, stores the acquired proxy information in the data management unit 502. Note that although, in the present embodiment, an example in which the proxy setting is performed after the device registration key is acquired has been explained, any order may be employed. The proxy setting (S1406 to S1410) may be performed first, and the device registration key acquisition process (S1401 to S1405) may be performed later.

In S1411, the device management unit 503 of the monitoring device 105 issues a device registration instruction to the authentication unit 403 of the image forming device 106. The device registration instruction includes the device registration key acquired in S1401. In S1412, the authentication unit 403 of the image forming device 106 requests the authentication/authorization server 102 to acquire an activation code. The activation code acquisition request includes the device registration key acquired in S1411 and the serial number of the image forming device 106.

In S1413, the authentication/authorization server 102 issues the activation code in response to the activation code acquisition request. First, the authentication/authorization server 102 confirms the validity of the device registration key by using the client management table and the device registration key management table based on the serial number and the device registration key included in the activation code acquisition request. In a case where the device registration key is valid, the authentication/authorization server 102 issues an activation code and stores the activation code in the activation code management table.

In S1414, the authentication/authorization server 102 transmits the activation code issued in S707 to the image forming device 106 that is the request source of the activation code acquisition request. In S709, the authentication unit 403 of the image forming device 106 performs an activation request to the authentication/authorization server 102. The activation request includes the device registration key, the activation code, and the serial number of the image forming device 106.

In S1416, the authentication/authorization server 102 issues a credential in response to the activation request. First, the authentication/authorization server 102 confirms the validity of the activation code. The authentication/authorization server 102 confirms the validity of the activation code based on the serial number, the device registration key, and the activation code included in the activation request, the client management table, and the activation code management table. In addition if the activation code is determined to be valid, the authentication/authorization server 102 issues a credential and stores the credential in the credential management table. Then, the authentication/authorization server 102 that has stored the credential updates the status information managed on the client management table to valid and stores the updated status information. In S1417, the authentication/authorization server 102 transmits the credential issued in S710 to the image forming device 106 that is the request source of the activation request.

The monitoring device 105 that has issued the device registration instruction in step 1411 then performs the device registration state confirmation processing in step 1418. In S1418, the device management unit 503 of the monitoring device 105 confirms the device registration state with the authentication unit 403 of the image forming device 106.

The device registration state confirmation processing will be explained with reference to FIG. 15. FIG. 15 is a flowchart illustrating the device registration state confirmation processing in the monitoring device 105. In S1501, the device management unit 503 of the monitoring device 105 initializes the count of the number of times that the device registration state has been acquired. Specifically, the device management unit 503 initializes the variable i=0. The variable i is a value for counting the number of times the device registration state has been acquired.

In S1502, the device management unit 503 of the monitoring device 105 requests the authentication unit 403 of the image forming device 106 to acquire the device registration state in the device management service, and acquires the device registration state as a response. In S1503, the device management unit 503 of the monitoring device 105 confirms whether or not the device registration state acquired in S1502 is "registered". If the device registration state has been registered, the device management unit 503 performs the process of S1504. In contrast, if the device registration state has not been registered, the device management unit 503 performs the process of S1505.

In S1504, the device management unit 503 of the monitoring device 105 changes the value of the registration state 805 of the device-management information table managed by the data-management unit 502 to "registered". In S1505, the device management unit 503 of the monitoring device 105 confirms whether or not the number of times of acquisition of the device registration state has reached the upper limit. Specifically, if the variable i is smaller than the threshold N, the device management unit 503 determines that the upper limit has not been reached. The threshold N is a value of a predetermined upper limit number of times of acquisition of the device registration state. If the variable i is not smaller than the threshold N, it is determined that the upper limit has been reached, and this processing ends. In contrast, if the variable i is smaller than the threshold N, it is determined that that the upper limit has not been reached, and the device management unit 503 performs the process of S1506. In S1506, the device management unit 503 of the monitoring device 105 increments the value of the variable i by one, and returns the process to S1502.

Next, re-registration determination processing of the image forming device 106 will be explained. FIG. 16 and FIG. 17 are flowcharts illustrating the re-registration determination processing of the image forming device. In the re-registration determination processing, it is determined whether to re-register a device registered as a device having no self-monitoring function as a device having a self-monitoring function. A device that does not have a self-monitoring function can also become a device having a self-monitoring function corresponding to the device management service due to the update of the firmware. Each process executed by the monitoring device 105 in the re-registration determination processing is realized by the CPU 303 of the monitoring device 105 executing a program stored in the memory 304.

In S1601, the task management unit 504 checks whether or not it is an execution timing of a capability determination task in which capability determination on the devices managed by the monitoring device 105 is performed. The capability determination processing is performed on an image forming device to which the capability determination has not been performed, that is, an image forming device whose monitoring type 806 is "Unknown". If it is the execution timing of the capability determination processing, the task management unit 504 performs the process of S1602. In contrast, if it is not the execution timing of the capability determination processing, the task management unit 504 returns the process to S1601.

In S1602 to S1607, the monitoring device 105 performs the capability determination task on all the devices managed in the monitoring device 105 one by one. When the capability determination processing for all the devices is completed, the capability determination task is completed. The task management unit 504 repeats the selection of one of all the devices managed in the monitoring device 105 and the execution of the processes from S1602 to S1607 until the processing is completed for all the devices managed in the monitoring device 105.

First, in S1602, the task management unit 504 determines whether or not the selected device is a device for which the capability determination processing is to be executed. The task management unit 504 determines whether or not the device is a device for which the capability determination processing is to be executed based on the management information of the device held by the data management unit 502. Specifically, in a case where the monitoring type 806 of the task management information table (FIG. 8) is "Unknown", the task management unit 504 determines that the device is a device for which the capability determination processing is to be executed and performs the process of S1603. In contrast, in a case where the monitoring type 806 is "Proxy" or "Polling", the task management unit 504 determines that the device is not a device for which the capability determination processing is to be executed, and the process of S1604 is performed.

In S1603, the monitoring device 105 performs the device capability determination processing. In the capability determination processing, the monitoring device 105 determines the capability of the device based on, for example, information indicating whether or not the device is a management target and information indicating whether or not the device has a self-monitoring function. The monitoring device 105 determines whether or not the device is a device to be managed based on the management state 804 of the device management information table. In addition, if the management state 804 is "management target", the monitoring device 105 acquires, for example, information indicating whether or not a service having a self-monitoring function is present as information indicating whether or not the device has a self-monitoring function, from the device. Additionally, information indicating whether or not a self-monitoring module corresponding to the self-monitoring unit 406 is installed in the device may be acquired. If the service having a self-monitoring function is present, it is determined that the device has a self-monitoring function. In contrast, if the service having a self-monitoring function is not present, it is determined that the device does not have a self-monitoring function.

In S1604, the task management unit 504 determines whether or not the selected device is a device for which the self-monitoring function determination processing is to be executed based on the management information of the devices held by the data management unit 502. The self-monitoring function determination processing is processing for determining whether or not the image forming device 106 that has already been registered in the authentication/authorization server 102 and is monitored by collecting monitoring data by periodical polling has become a device having a self-monitoring function due to firmware update. Therefore, the device for which the self-monitoring function determination processing is to be executed is a device that is to be managed, has already been registered, and is monitored by Polling. The task management unit 504 determines whether or not the device is a target of the self-monitoring function determination processing based on the management state 804, the registration state 805, and the monitoring type 806 of the device management information table. If it is determined that the device is a target of the self-monitoring function determination processing, the task management unit 504 performs the process of S1605. In contrast, if it is determined that the device is not a target of the self-monitoring function determination processing, the task management unit 504 ends the processing of the capability determination task and performs the process of S1608.

In S1605, the determination unit 512 of the device management unit 503 performs the self-monitoring function determination processing. In the self-monitoring function determination processing, the device management unit 503 determines whether or not the target device has a self-monitoring function. Whether or not the device has a self-monitoring function is determined, for example, by determining whether or not a predetermined service having a self-monitoring function is present in the device. Additionally, it may be determined whether or not the device has a self-monitoring function by confirming whether or not the device is upgraded to a predetermined firmware. Additionally, it may be determined whether or not the device has a self-monitoring function by confirming information indicating whether or not a self-monitoring module corresponding to the self-monitoring unit 406 is installed in the device.

In S1606, the determination unit 512 of the device management unit 503 determines the result of the self-monitoring function determination processing in S1605. If it is determined that the devices have a self-monitoring function, the device management unit 503 performs the process of S1607. In contrast, if it is determined that the device does not have a self-monitoring function, the device management unit 503 ends the processing of the capability determination task, and performs the process of S1608. In S1607, the determination unit 512 of the device management unit 503 sets a re-registration flag in the device management information table managed by the data management unit 502. In the setting of the re-registration flag, the device management unit 503 updates the value of the device management information table re-registration flag 807 to "1".

In S1608, the task management unit 504 starts the execution of the device registration task. The monitoring device 105 performs the processing of the device registration task on all the devices managed in the monitoring device 105 one by one in the processes from S1609 to S1614. When the processing is completed for all the devices, the device registration task is completed. The task management unit 504 repeats the selection of one of all the devices managed in the monitoring device 105 and the execution of the processes from S1609 to S1614 until the processes are completed for all the devices managed in the monitoring device 105.

In S1609, the task management unit 504 determines whether or not the selected device is a device for which the re-registration processing is to be executed based on the device management information held by the data management unit 502. The re-registration processing is processing for re-registering a device in order to monitor the device that has already been monitored by periodic polling via the proxy of the monitoring device 105. The device to be the target of the re-registration processing is a device in which firmware is updated to a device having a self-monitoring function from a device having no self-monitoring function and whose monitoring data has been collected by periodic polling. Therefore, the device to be a target of the re-registration processing is a device for which a re-registration flag has been set in the device management information table. In a case where the value of the re-registration flag 807 is "1" and it has been determined that the device is a target of the re-registration processing, the task management unit 504 performs the process of S1610. In a case where it is determined that the value of the re-registration flag 807 is "0" and the device is not a target of the re-registration processing, the task management unit 504 performs the process of S1611. In S1610, the task management unit 504 performs the device-reregistration processing. Details of the device re-registration processing will be explained below with reference to FIG. 18.

In S1611, the task management unit 504 determines whether or not the selected device is a device for which the registration processing is to be executed based on the management information of the management of the devices held by the data management unit 502. The registration processing is a process of registering the image forming device 106 that is a management target and has not been registered in the authentication/authorization server 102. Therefore, the device that is the target of registration processing is the image forming device 106 that is to be managed and has not been registered. The task management unit 504 determines whether or not the device is a target of the registration processing based on the management state 804 and the registration state 805 of the device management information table. In a case where the management state 804 is "management target" and the registration state 805 is "unregistered", the task management unit 504 determines that the device is a target of the registration processing. In a case where it is determined that the device is a device for which the registration processing is to be executed, the task management unit 504 performs the process of S1612. In contrast, in a case where it is determined that the device is not a device for which the registration processing is to be executed, the task management unit 504 performs the process of S1613. In S1612, the monitoring device 105 performs the device registration processing. In the device registration processing, if the device does not have a self-monitoring function, the process of step S606 (FIG. 7) is performed, and if the device has a self-monitoring function, the process of step S607 (FIG. 14) is performed.

In S1613, the task management unit 504 determines whether or not the selected device is a device for which device deregistration processing is to be executed based on the management information of the devices held by the data management unit 502. The deregistration processing is processing for cancelling the registration of a device that is not a management target and has been registered in the authentication/authorization server 102. Accordingly, a device for which deregistration processing is to be executed is a device that is not a management target and has already been registered. In a case where the management state 804 is "not a management target" and the registration state 805 has been "registered" in the device management information table, it is determined that the deregistration processing is to be executed, and the task management unit 504 performs the process of S1614. In contrast, in a case where the management state 804 is "not a management target" and the registration state 805 has not been "registered", it is determined that the device is not a device for which the deregistration processing is to be executed, and the task management unit 504 ends this processing. In step S1614, the task management unit 504 executes the device deregistration processing. Note that the deregistration processing is not directly related to the present invention, and the explanation thereof will be omitted.

Figure 18:
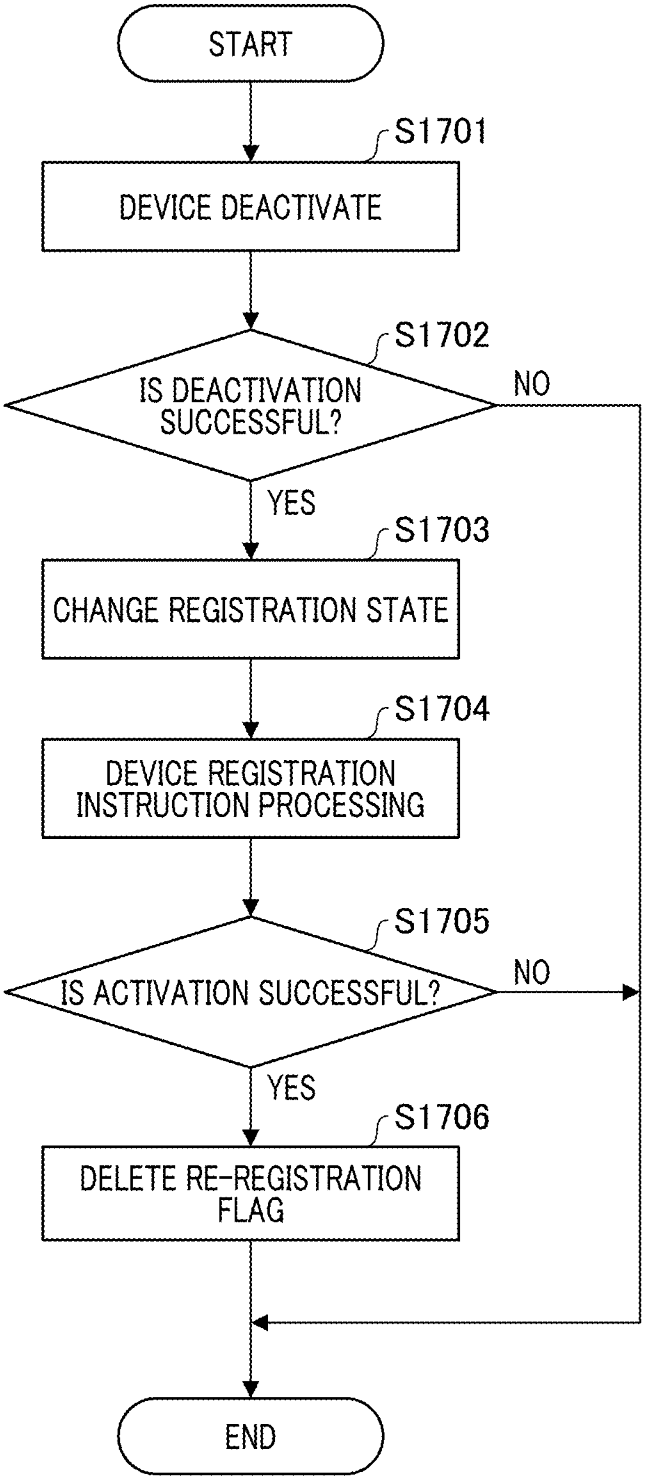
FIG. 18 is a flowchart illustrating an example of the re-registration processing of the image forming apparatus.

Next, the re-registration processing of the device in S1610 will be explained in detail with reference to FIG. 18. FIG. 18 is a flowchart showing the re-registration processing of the image forming device 106. The device that is a target of the re-registration processing in step S1610 is a device that has no self-monitoring function and has been monitored by periodic polling to collect monitoring data, but has a self-monitoring function due to firmware update and the like. The monitoring using the proxy mode of the monitoring device 105 can provide more services to the device than the polling mode. Therefore, the device having a self-monitoring function deactivates the registration as a device not having a self-monitoring function so that the monitoring device 105 in the proxy mode can be used, and performs the registration processing as a device having a self-monitoring function.

In S1701, the device management unit 503 performs deactivation processing of the target devices. In the deactivation processing, a deactivation request for the target device is performed on the authentication/authorization server 102. The deactivation request includes information on the device management service device ID 808 of the devices to be deactivated. Upon receiving the deactivation processing request from the monitoring device 105, the authentication/authorization server 102 changes the status 1004 of the target device managed in the client management table (FIG. 10) to "invalid" based on the device management service device ID 808. Then, the authentication/authorization server 102 transmits the result of the deactivation processing to the monitoring device 105 that is the request source of the deactivation request.

In S1702, the device management unit 503 determines whether or not the deactivation of the target device is successful based on a response from the authentication/authorization server 102 to the deactivation request. If the deactivation is successful, the monitoring device 105 performs the process of S1703. In contrast, if the deactivation has failed, this process ends. In S1703, the device management unit 503 changes the registration state 805 from "registered" to "unregistered" and the monitoring type 806 from "Polling" to "Proxy" in the device management-information table (FIG. 8) held by the data management unit 502. As a result, the monitoring type of the target device in the monitoring device 105 is updated from the polling mode to the proxy mode.

In S1704, the registration unit 513 of the device management unit 503 performs registration processing of the target device as a device having a self-monitoring function. The registration processing as a device having a self-monitoring function executed in S1704 is similar to the registration processing of the image forming device having a self-monitoring function as shown in FIG. 14. By this processing, the monitoring device 105 sets the proxy information of the proxy server 501 in the target device, and enables the target device to use the proxy server 501 of the monitoring device 105 (S1406 to S1410). Additionally, a device registration instruction using the device registration key is provided to the target device (S1411), and the target device communicates with the authentication/authorization server 102 and device registration is performed (S1412 to S1417).

In S1705, the device management unit 503 determines whether or not the activation has succeeded. Whether or not the activation has succeeded is determined based on a response to the activation request that has been acquired from the authentication/authorization server 102 in S1417. If the activation is successful, the device management unit 503 performs the process of S1706. In contrast, if the activation has failed, the device management unit 503 ends this processing. In S1706, the device management unit 503 updates the device management information held by the data management unit 502. The device management unit 503 deletes the re-registration flag in the management information of the device. Specifically, the device management unit 503 updates the value of the re-registration flag 807 in the device management information table from "1" to "0". Thus, the processing for the re-registration so that the device having a self-monitoring function due to firmware update and the like can use the proxy server 501 is completed. Additionally, the device management unit 503 updates the registration state 805 of the device management information table, which has been updated to "unregistered" in S1703, from "unregistered" to "registered".

As described above, according to the present embodiment, the device capability information can be periodically checked for a monitoring target device that does not have a self-monitoring function, and if the device becomes a device having a self-monitoring function, the device can be re-registered as a device having a self-monitoring function. By the re-registration processing, the monitoring method of the device performed by the monitoring device can be switched from the polling mode to the proxy mode without time and effort of the user. As a result, the device registration state on the cloud service side can be dynamically switched according to the capability state of the device, and device monitoring can be appropriately managed without requiring time and effort of the service provider.

Second Embodiment

In the first embodiment, the monitoring method is switched by periodically checking the capability information of the device and re-registering the device as a device having a self-monitoring function. However, if there is data that has not been sent to the cloud service obtained by periodic polling when switching the monitoring method, the monitoring data is lost. Therefore, if any unsent monitoring data held by the data management unit 502 is present in the data transmission unit 505 before the device deactivation process (S1701) of the device re-registration, the unsent monitoring data may be transmitted to the resource server 103. By transmitting the unsent monitoring data to the resource server 103 before the execution of the device deactivation processing, it is possible to continuously manage the monitoring data without data loss even when the monitoring method is switched.

Third Embodiment

The monitoring device 105 has a setting unit that switches the monitoring mode (polling mode or proxy mode). In a case where the monitoring mode is the polling mode, the monitoring type becomes the polling mode even in the device having a self-monitoring function, and the proxy server of the monitoring device cannot be used. In a case where the monitoring mode is the proxy mode, the monitoring type of the device not having a self-monitoring function is the polling mode, but the device having a self-monitoring function is caused to use the proxy server of the monitoring device and to switch the monitoring type to the proxy mode.

In the first embodiment, a case has been explained in which a device that does not have a self-monitoring function becomes a device that has a self-monitoring function due to a firmware update while the device is being monitored via a monitoring device. However, the monitoring device can be set by switching the monitoring mode, and in the case where the monitoring device is in the polling mode, even a device having a self-monitoring function cannot use the proxy server of the monitoring device. Thus, there is a case where, even in a device that originally has a self-monitoring function, the monitoring mode of the monitoring device is monitored in the polling mode instead of the proxy mode, which is a mode in which the proxy server function is used. In a case where the monitoring mode of the monitoring device is switched from the polling mode to the proxy mode, in order for the device having a self-monitoring function to receive the device management service by using the proxy server of the monitoring device, the device needs to be re-registered in the device management service. Accordingly, in the present embodiment, in a case where the monitoring mode of the monitoring device is switched to the proxy mode, the monitoring method of the device having a self-monitoring function is switched, and an instruction is issued to register the device as having a self-monitoring function in the device management service. Hereinafter, only differences from the first embodiment will be explained, and the similar configurations and processes as those of the first embodiment will be denoted by the same reference numerals, and the explanation thereof will be omitted.

Figure 19:
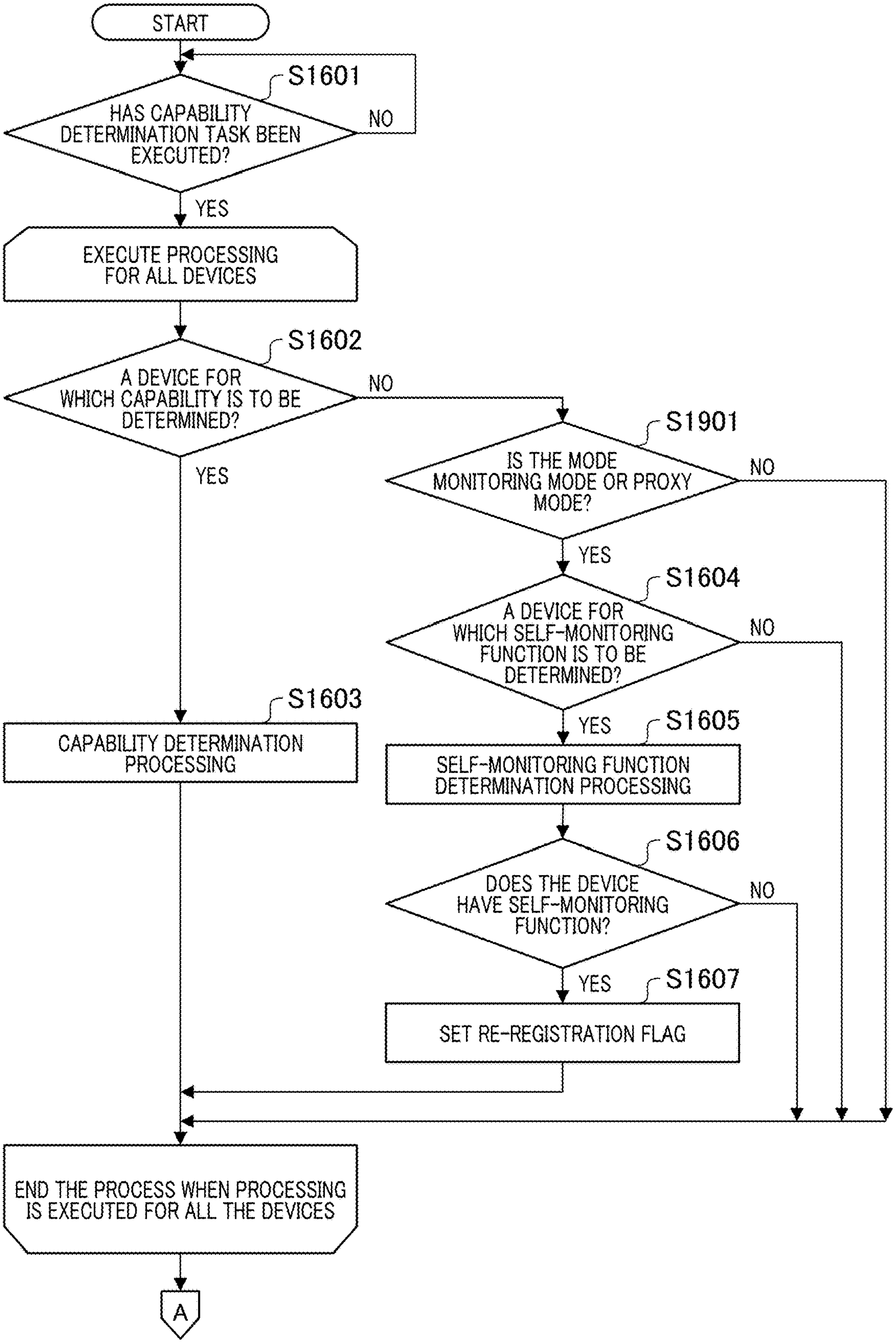
FIG. 19 is a flowchart illustrating an example of the re-registration determination processing of the image forming apparatus according to the third embodiment.

The re-registration determination processing of the image forming device 106 that is a network device to be managed according to the present embodiment will be explained. FIG. 19 and FIG. 17 are flowcharts illustrating the re-registration determination processing of the image forming device according to the third embodiment. In the re-registration determination processing according to the present embodiment, whether or not to re-register the device as a device having a self-monitoring function is determined according to the monitoring mode of the monitoring device 105. Specifically, if the monitoring mode of the monitoring device 105 is the proxy mode, processing for determining whether or not to re-register the device as a device having a self-monitoring function is performed. Each process executed by the monitoring device 105 in the re-registration determination processing is realized by the CPU 303 of the monitoring device 105 executing a program stored in the memory 304. The processes as illustrated in FIG. 19 are executed, for example, when the setting of the monitoring mode of the monitoring device 105 has changed.

S1601 is similar to that in the first embodiment. In S1602, the task management unit 504 determines whether or not the selected device is a device on which the capability determination processing is to be executed. The task management unit 504 determines whether or not the device is a device for which the capability determination processing is to be executed based on the management information of the device held by the data management unit 502. Specifically, in a case where the monitoring type 806 of the device management information table (FIG. 8) is "Unknown", the task management unit 504 determines that the device is a device for which the capability determination processing is to be executed, and performs the process of S1603. In contrast, in a case where the monitoring type 806 is "Proxy" or "Polling", the task management unit 504 determines that the device is not a device for which the capability determination processing is to be executed, and performs the process of S1901.

In S1901, the task management unit 504 determines whether or not the monitoring mode of the monitoring device 105 is the proxy mode. The monitoring mode as the monitoring device 105 is information indicating how to manage the image forming device 106. The management device 105 according to the present embodiment has a proxy mode and a polling mode as monitoring modes, and one of the proxy mode and the polling mode is set as the monitoring mode. For example, in the "polling mode", the monitoring device 105 monitors all the devices by polling, regardless of the functions of the devices. In the "proxy mode", the monitoring device 105 manages a device having a self-monitoring function by using the proxy server 501 of the monitoring device 105 and monitors a device having no self-monitoring function by polling.

The task management unit 504 determines whether or not the monitoring mode of the monitoring device 105 is the proxy mode based on the information of the monitoring mode management table held by the data management unit 502. FIG. 20 is a diagram illustrating an example of a monitoring mode management table. A monitoring mode management table 2000 is a table in which the settings of the monitoring mode as the monitoring device 105 are stored. The monitoring mode management table 2000 is stored in the data management unit 502. The monitoring mode management table 2000 has a setting item (Key) and a setting value (Value). In the example as shown in FIG. 20, "Mode" indicating the monitoring mode is stored in the setting item (Key), and "Proxy" indicating the proxy mode is stored in the setting value (Value). In a case where the monitoring mode is the polling mode, "Polling" is stored in the setting value (Value).

Figure 21:
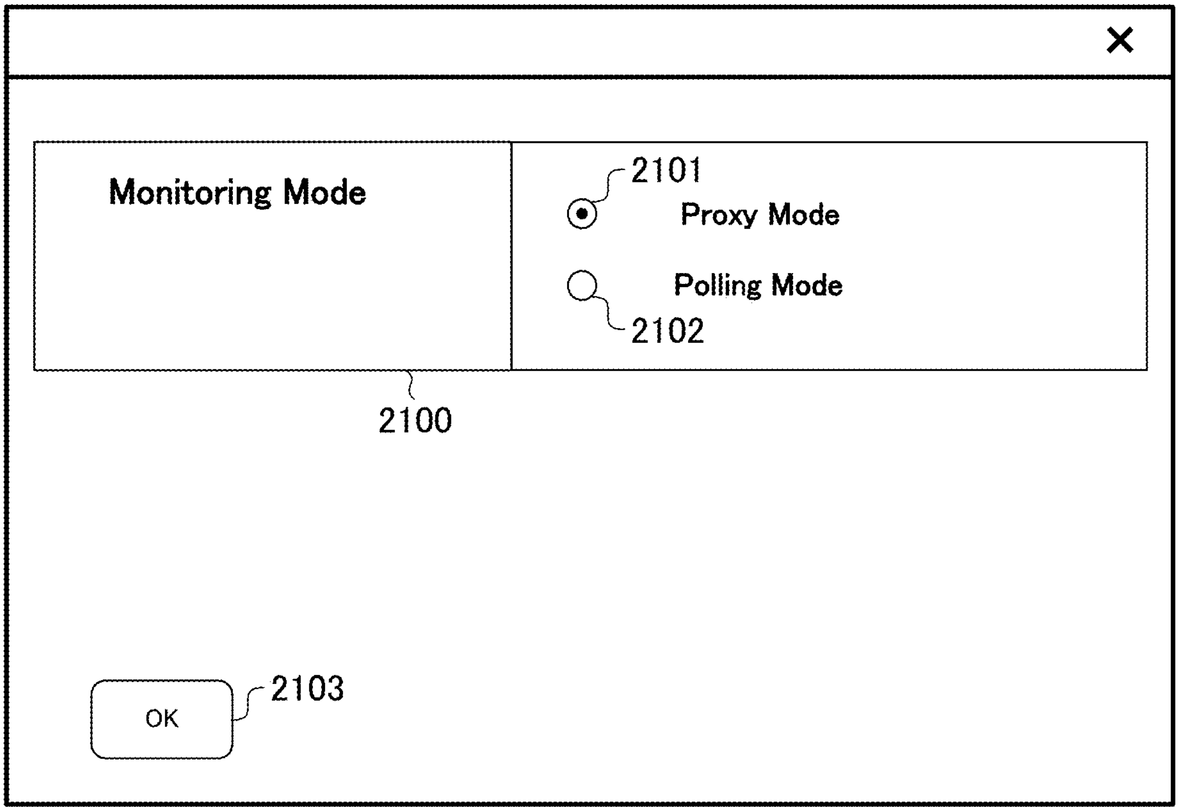
FIG. 21 is a diagram illustrating an example of a monitoring mode setting screen.

The monitoring mode is set by a user from a monitoring mode setting screen that the monitoring device has in advance. FIG. 21 is a diagram illustrating an example of a monitoring mode setting screen. A monitoring mode setting region 2100 for setting the monitoring mode and an OK button 2103 are displayed on the monitoring mode setting screen. A proxy mode and a polling mode are displayed in the monitoring mode setting region 2100, and the user selects one of the modes. In the example as shown in FIG. 21, a radio button 2101 for selecting the proxy mode and a radio button 2102 for selecting the polling mode are displayed, and the user selects one of the radio buttons, so that the monitoring mode of the monitoring device 105 is selected. By pressing the OK button 2103 after the selection of the monitoring mode, the selected monitoring mode is set as the monitoring mode of the monitoring device 105. Information on the set monitoring mode is managed by the monitoring mode management table (FIG. 20) held by the data management unit 502. Note that the radio button is an example, and it suffices if the monitoring mode of the monitoring device 105 is set on the monitoring mode setting screen.

In S1901, the task management unit 504 determines whether or not the monitoring mode of the monitoring device 105 is the proxy mode based on the settings of the monitoring mode managed in the monitoring mode management table (FIG. 20). In a case where the setting value (Value) of the monitoring mode management table is "Proxy", the task management unit 504 determines that the monitoring mode of the monitoring device 105 is the proxy mode, and performs the process of S1604. In a case where the monitoring mode of the monitoring device 105 is the proxy mode, the monitoring device 105 can cause a device having a self-monitoring function to use the proxy server 501 of the monitoring device 105. Therefore, a series of processes (S1604 to S1607) for confirming whether or not the device has a self-monitoring function are performed. That is, in a case where the monitoring mode of the device performed by the monitoring device 105 is switched to the proxy mode in which the device uses the proxy server function of the monitoring device 105, the determination unit 512 determines whether or not the device has a self-monitoring function for the device management service. In contrast, in a case where the setting value (Value) of the monitoring mode management table is "Polling", the task management unit 504 determines that the monitoring mode of the monitoring device 105 is the polling mode and is not the proxy mode, and performs the process of S1608 (FIG. 17). In a case where the monitoring mode of the monitoring device 105 is the polling mode, the device cannot use the proxy server 501 of the monitoring device 105, and it is not necessary to re-register the device having a self-monitoring function. Therefore, in the case where the monitoring mode of the monitoring device 105 is the polling mode, a series of processes (S1604 to S1607) for confirming whether or not the device has a self-monitoring function are not executed. The processes in step S1604 and subsequent steps are similar to those in the first embodiment.

In S1607, the monitoring device 105 changes the registration state 805 from "registered" to "unregistered" and the monitoring type 806 from "Polling" to "Proxy" in the device management information table (FIG. 8) for the devices for which the re-registration flag has been set in S1703. As a result, the monitoring type of the target device in the monitoring device 105 is updated from the polling mode to the proxy mode. Then, in S1704, the monitoring device 105 instructs registration processing (FIG. 14) for registering the target device in the device-management service as device having a self-monitoring function. By the above-described processing, in the case where the monitoring mode of the monitoring device is switched from the polling mode to the proxy mode, it is determined whether or not the device has a self-monitoring function, and if the device has a self-monitoring function, the device can be reregistered as a device having a self-monitoring function. By performing the registration processing as a device having a self-monitoring function, the device can use the proxy server 501 of the monitoring device 105 in the proxy mode, and can receive more services than in the polling mode.

As described above, according to the present embodiment, even if the monitoring mode of the monitoring device is switched from the polling mode to the proxy mode, the monitoring type of the device can be switched from the polling mode to the proxy mode, and a re-registration instruction can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-173236, filed Oct. 4, 2023, Japanese Patent Application No. 2024-83628, filed May 22, 2024, which are hereby incorporated by reference wherein in their entirety.

What is claimed is:

1. A relay device including a proxy server function of relaying communication between a device management service and a device comprising:
- a memory storing instructions; and
- a processor executing the instructions causing the relay device to:
- determine whether or not a device receiving a device management service without using a proxy server function of the relay device has a self-monitoring function for the device management service;
- perform proxy setting on the device using proxy information of a proxy server function of the relay device in a case where the device has a self-monitoring function; and
- provide a registration instruction to a device to which the proxy setting has been performed to be re-registered as a device having a self-monitoring function in the device management service.

2. The relay device according to claim 1, wherein in a case where the device has a self-monitoring function, deactivation of the device is requested to the device management service, and after the deactivation is completed, the proxy setting is performed.

3. The relay device according to claim 2,
- wherein the process further executes an instruction causing the relay device to manage device information,
- wherein when the deactivation of the device is completed, the processor updates information on a registration state of the device from information indicating registered to information indicating unregistered, and when a request for activation to the device management service from the device that has received the registration instruction is successful, the information on the registration state of the device is updated from information indicating unregistered to information indicating registered.

4. The relay device according to claim 3, wherein when the deactivation of the device is completed, the processor updates a monitoring type for the device from a polling mode in which device information is collected by periodic polling to a proxy mode in which in which the proxy server function is used by the device.

5. The relay device according to claim 2, wherein in a case where it is determined that the device has a self-monitoring function and unsent data to the device management service that has been collected from the device is present, the data is transmitted to the device management service before requesting the device management service to deactivate the device.

6. The relay device according to claim 1, wherein in a case where a monitoring mode of a device by the relay device is switched to a mode in which the proxy server function of the relay device is used by the device, the processor determines whether or not the device has a self-monitoring function for the device management service.

7. The relay device according to claim 1, wherein the device is an image forming device, and an image forming device not having a self-monitoring function for the device management service is updated to an image forming device having a self-monitoring function due to update of firmware.

8. A control method of a relay device including a proxy server function of relaying communication between a device management service and a device, the method comprising:

determining whether or not a device receiving a device management service without using a proxy server function of the relay device has a self-monitoring function for the device management service;

performing proxy setting on a device using proxy information of a proxy server function of the relay device in a case where the device has a self-monitoring function; and providing a registration instruction to a device to which the proxy setting has been performed to be re-registered as a device having a self-monitoring function in the device management service.

9. A non-transitory storage medium storing a control program of a zoom control device causing a computer to perform each step of a control method of the zoom control device, the method comprising:

determining whether or not a device receiving a device management service without using a proxy server function of the relay device has a self-monitoring function for the device management service;

performing proxy setting on a device using proxy information of a proxy server function of the relay device in a case where the device has a self-monitoring function; and providing a registration instruction to the device for which the proxy setting has been performed to be re-registered as a device having a self-monitoring function in the device management service.

* * * * *